(12) United States Patent
Lubczynski et al.

(10) Patent No.: US 11,176,620 B1
(45) Date of Patent: Nov. 16, 2021

(54) SYSTEMS AND METHODS FOR GENERATING AN ERROR REPORT LISTING ERRORS IN THE PREPARATION OF A PAYROLL TAX FORM

(71) Applicant: INTUIT INC., Mountain View, CA (US)

(72) Inventors: Peter E. Lubczynski, San Diego, CA (US); Gang Wang, San Diego, CA (US); Paul A. Parks, Alpine, CA (US); Kevin M. McCluskey, Carlsbad, CA (US); Ernest Montoya, San Diego, CA (US); David A. Hanekamp, Jr., Carlsbad, CA (US); Kyle J. Ryan, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 535 days.

(21) Appl. No.: 15/195,986

(22) Filed: Jun. 28, 2016

(51) Int. Cl.
*G06Q 40/00* (2012.01)

(52) U.S. Cl.
CPC ......... *G06Q 40/123* (2013.12); *G06Q 40/125* (2013.12)

(58) Field of Classification Search
CPC ........................... G06Q 40/123; G06Q 40/125
USPC .......................................................... 705/31
See application file for complete search history.

(56) References Cited

U.S. PATENT DOCUMENTS

| 4,213,251 A * | 7/1980 | Foundos ................ G06K 19/04 434/327 |
| 4,809,219 A | 2/1989 | Ashford et al. |
| 5,006,998 A | 4/1991 | Yasunobu |
| 5,495,607 A | 2/1996 | Pisello et al. |

(Continued)

FOREIGN PATENT DOCUMENTS

| JP | 2002-117121 A | 4/2002 |
| JP | 2005-190425 A | 7/2005 |

(Continued)

OTHER PUBLICATIONS

Title: Privacy in the Cloud: Anonymous Tax Preparation Author: Emmanuel S. Peters et al. Date: Apr. 2016 (Year: 2016).*

(Continued)

*Primary Examiner* — Christopher Bridges
*Assistant Examiner* — Yongsik Park
(74) *Attorney, Agent, or Firm* — DLA Piper LLP (US)

(57) ABSTRACT

Computer-implemented systems, methods and articles for generating an error report listing errors identified in the computerized preparation of a payroll tax form. The system includes a computing device, a data store, and a payroll tax form software application executable by the computing device. The payroll tax form software includes a payroll calculation engine, an error check engine, and one or more error graph(s). Each error graph includes a plurality of interconnected nodes configured to utilize tax data and calculated payroll data to identify errors. The calculation engine is configured to read tax data from the shared data store, perform payroll calculation operations, and write (Continued)

calculated payroll data to the shared data store. The error check engine is configured to read the tax data and payroll data and process the error graph(s) to identify errors and generate an error report listing the errors and/or explanations of the errors.

23 Claims, 18 Drawing Sheets

(56) References Cited

U.S. PATENT DOCUMENTS

| | | | |
|---|---|---|---|
| 5,557,761 A | 9/1996 | Chan et al. | |
| 5,673,369 A | 9/1997 | Kim | |
| 5,742,836 A | 4/1998 | Turpin et al. | |
| 5,819,249 A | 10/1998 | Dohanich | |
| 6,078,898 A | 6/2000 | Davis | |
| 6,411,938 B1* | 6/2002 | Gates | G06Q 20/042 |
| | | | 705/30 |
| 6,535,883 B1 | 3/2003 | Lee et al. | |
| 6,601,055 B1 | 7/2003 | Roberts | |
| 6,631,361 B1 | 10/2003 | O'Flaherty et al. | |
| 6,670,969 B1 | 12/2003 | Halstead et al. | |
| 6,690,854 B2 | 2/2004 | Helbing | |
| 6,697,787 B1 | 2/2004 | Miller | |
| 6,898,573 B1 | 5/2005 | Piehl | |
| 6,912,508 B1 | 6/2005 | McCalden | |
| 7,234,103 B1 | 6/2007 | Regan | |
| 7,295,998 B2 | 11/2007 | Kulkarni | |
| 7,331,045 B2 | 2/2008 | Martin et al. | |
| 7,448,022 B1 | 11/2008 | Ram et al. | |
| 7,539,635 B1 | 5/2009 | Peak et al. | |
| 7,565,312 B1 | 7/2009 | Shaw | |
| 7,603,301 B1* | 10/2009 | Regan | G06Q 10/10 |
| | | | 705/30 |
| 7,668,763 B1 | 2/2010 | Albrecht | |
| 7,680,756 B2 | 3/2010 | Quinn | |
| 7,685,082 B1 | 3/2010 | Coletta | |
| 7,693,760 B1 | 4/2010 | Fiteni | |
| 7,693,769 B1 | 4/2010 | Burlison et al. | |
| 7,716,094 B1 | 5/2010 | Sutter et al. | |
| 7,742,958 B1 | 6/2010 | Leek | |
| 7,747,484 B2* | 6/2010 | Stanley | G06Q 40/123 |
| | | | 705/31 |
| 7,761,333 B2 | 7/2010 | Kapp | |
| 7,778,895 B1 | 8/2010 | Baxter | |
| 7,818,222 B2* | 10/2010 | Allanson | G06Q 40/12 |
| | | | 705/31 |
| 7,849,405 B1 | 12/2010 | Coletta | |
| 7,860,763 B1 | 12/2010 | Quinn et al. | |
| 7,865,829 B1* | 1/2011 | Goldfield | G06F 9/453 |
| | | | 715/708 |
| 7,895,102 B1 | 2/2011 | Wilks et al. | |
| 7,899,757 B1 | 3/2011 | Talan | |
| 7,900,298 B1 | 3/2011 | Char et al. | |
| 7,908,190 B2 | 3/2011 | Enenkiel | |
| 7,912,767 B1 | 3/2011 | Cheatham et al. | |
| 7,912,768 B2 | 3/2011 | Abeles | |
| 7,925,553 B2 | 4/2011 | Banks | |
| 8,001,006 B1 | 8/2011 | Yu | |
| 8,019,664 B1 | 9/2011 | Tifford et al. | |
| 8,082,144 B1* | 12/2011 | Brown | G06Q 20/207 |
| | | | 704/9 |
| 8,086,970 B2 | 12/2011 | Achtermann et al. | |
| 8,108,258 B1 | 1/2012 | Slattery | |
| 8,126,820 B1 | 2/2012 | Talan | |
| 8,190,499 B1 | 5/2012 | McVickar | |
| 8,204,805 B2 | 6/2012 | Eftekhari | |
| 8,224,726 B2 | 7/2012 | Murray | |
| 8,234,562 B1* | 7/2012 | Evans | G06F 40/174 |
| | | | 715/224 |
| 8,244,607 B1 | 8/2012 | Quinn | |
| 8,346,635 B1 | 1/2013 | Olim | |
| 8,346,680 B2 | 1/2013 | Castleman | |
| 8,370,795 B1* | 2/2013 | Sage | G06F 40/18 |
| | | | 717/104 |
| 8,386,344 B2 | 2/2013 | Christina | |
| 8,407,113 B1 | 3/2013 | Eftekhari | |
| 8,417,596 B1 | 4/2013 | Dunbar et al. | |
| 8,417,597 B1 | 4/2013 | McVickar | |
| 8,447,667 B1 | 5/2013 | Dinamani et al. | |
| 8,452,676 B1 | 5/2013 | Talan | |
| 8,473,880 B1 | 6/2013 | Bennett et al. | |
| 8,478,671 B1 | 7/2013 | Tifford | |
| 8,510,187 B1 | 8/2013 | Dinamani | |
| 8,527,375 B1 | 9/2013 | Olim | |
| 8,560,409 B2 | 10/2013 | Abeles | |
| 8,583,516 B1 | 11/2013 | Pitt | |
| 8,589,262 B1 | 11/2013 | Gang | |
| 8,607,353 B2 | 12/2013 | Rippert et al. | |
| 8,612,318 B1* | 12/2013 | Blowers | G06Q 40/00 |
| | | | 705/31 |
| 8,635,127 B1 | 1/2014 | Shaw | |
| 8,639,616 B1 | 1/2014 | Rolenaitis | |
| 8,682,756 B1 | 3/2014 | Tifford et al. | |
| 8,682,829 B2 | 3/2014 | Barthel | |
| 8,694,395 B2 | 4/2014 | Houseworth | |
| 8,706,580 B2 | 4/2014 | Houseworth | |
| 8,788,412 B1 | 7/2014 | Hamm | |
| 8,812,380 B2 | 8/2014 | Murray | |
| 8,813,178 B1 | 8/2014 | Khanna | |
| 8,838,492 B1 | 9/2014 | Baker | |
| 8,892,467 B1 | 11/2014 | Ball | |
| 8,949,270 B2 | 2/2015 | Newton et al. | |
| 9,117,247 B2* | 8/2015 | Lieberman | G06Q 40/123 |
| 9,372,687 B1 | 6/2016 | Pai | |
| 9,690,854 B2 | 6/2017 | Stent et al. | |
| 9,760,953 B1 | 9/2017 | Wang et al. | |
| 9,916,628 B1 | 3/2018 | Wang et al. | |
| 9,922,376 B1 | 3/2018 | Wang et al. | |
| 9,990,678 B1 | 6/2018 | Cabrera et al. | |
| 2002/0065831 A1 | 5/2002 | DePaolo | |
| 2002/0107698 A1 | 8/2002 | Brown et al. | |
| 2002/0111888 A1 | 8/2002 | Stanley | |
| 2002/0174017 A1 | 11/2002 | Singh | |
| 2002/0198832 A1 | 12/2002 | Agee | |
| 2003/0101070 A1 | 5/2003 | Mahosky et al. | |
| 2003/0126054 A1 | 7/2003 | Purcell | |
| 2003/0139827 A1 | 7/2003 | Phelps | |
| 2003/0174157 A1 | 9/2003 | Hellman | |
| 2003/0182102 A1 | 9/2003 | Corston-Oliver et al. | |
| 2004/0002906 A1* | 1/2004 | Von Drehnen | G06Q 30/0641 |
| | | | 705/31 |
| 2004/0019540 A1 | 1/2004 | William | |
| 2004/0019541 A1 | 1/2004 | William | |
| 2004/0021678 A1 | 2/2004 | Ullah et al. | |
| 2004/0078271 A1 | 4/2004 | Morano | |
| 2004/0083164 A1 | 4/2004 | Schwartz et al. | |
| 2004/0088233 A1 | 5/2004 | Brady | |
| 2004/0117395 A1 | 6/2004 | Gong | |
| 2004/0172347 A1* | 9/2004 | Barthel | G06N 5/04 |
| | | | 705/31 |
| 2004/0181543 A1 | 9/2004 | Wu et al. | |
| 2004/0205008 A1 | 10/2004 | Haynie et al. | |
| 2005/0171822 A1 | 8/2005 | Cagan | |
| 2005/0216379 A1 | 9/2005 | Ozaki | |
| 2005/0262191 A1* | 11/2005 | Mamou | G06F 16/254 |
| | | | 709/203 |
| 2005/0278233 A1* | 12/2005 | Brass | G06Q 40/123 |
| | | | 705/31 |
| 2006/0020545 A1* | 1/2006 | Lindheimer | G06Q 40/02 |
| | | | 705/40 |
| 2006/0112114 A1 | 5/2006 | Yu | |
| 2006/0155618 A1 | 7/2006 | Wyle | |
| 2006/0155632 A1 | 7/2006 | Cherkas et al. | |
| 2006/0178961 A1 | 8/2006 | Stanley et al. | |
| 2006/0282354 A1 | 12/2006 | Varghese | |
| 2006/0293990 A1 | 12/2006 | Schaub | |
| 2007/0033116 A1 | 2/2007 | Murray | |
| 2007/0033117 A1 | 2/2007 | Murray | |
| 2007/0033130 A1 | 2/2007 | Murray | |
| 2007/0055571 A1 | 3/2007 | Fox et al. | |
| 2007/0094207 A1 | 4/2007 | Yu | |

(56) References Cited

U.S. PATENT DOCUMENTS

| | | |
|---|---|---|
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0192166 A1 | 8/2007 | Van Luchene |
| 2007/0250418 A1 | 10/2007 | Banks et al. |
| 2008/0021799 A1* | 1/2008 | Blowers .......... G06Q 40/02 705/30 |
| 2008/0059900 A1 | 3/2008 | Murray |
| 2008/0097878 A1 | 4/2008 | Abeles |
| 2008/0126170 A1 | 5/2008 | Leck et al. |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0037847 A1 | 2/2009 | Achtermann et al. |
| 2009/0048957 A1 | 2/2009 | Celano |
| 2009/0064851 A1 | 3/2009 | Morris et al. |
| 2009/0117529 A1 | 5/2009 | Goldstein |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1* | 10/2009 | Kiersky .......... G06N 20/00 706/47 |
| 2010/0036760 A1 | 2/2010 | Abeles |
| 2010/0088124 A1 | 4/2010 | Diefendorf et al. |
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0173222 A1 | 7/2011 | Sayal et al. |
| 2011/0225220 A1 | 9/2011 | Huang et al. |
| 2011/0258195 A1 | 10/2011 | Welling |
| 2011/0258610 A1 | 10/2011 | Aaraj et al. |
| 2011/0264569 A1* | 10/2011 | Houseworth .......... G06Q 40/10 705/31 |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1* | 5/2012 | Eftekhari .......... G06Q 40/02 705/31 |
| 2012/0109793 A1 | 5/2012 | Abeles |
| 2012/0136764 A1* | 5/2012 | Miller .......... G06Q 40/123 705/31 |
| 2012/0278365 A1 | 11/2012 | Labat et al. |
| 2013/0036347 A1 | 2/2013 | Eftekhari |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0187926 A1 | 7/2013 | Silverstein et al. |
| 2013/0198047 A1 | 8/2013 | Houseworth |
| 2013/0218735 A1 | 8/2013 | Murray |
| 2013/0262279 A1* | 10/2013 | Finley .......... G06Q 40/10 705/31 |
| 2013/0282539 A1 | 10/2013 | Murray |
| 2013/0290169 A1 | 10/2013 | Bathula |
| 2013/0346266 A1* | 12/2013 | Howe .......... G06Q 20/207 705/31 |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0071112 A1 | 3/2016 | Unser |
| 2016/0078567 A1 | 3/2016 | Goldman |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0140668 A1* | 5/2016 | Maguire .......... G06Q 40/123 705/31 |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang |
| 2018/0032855 A1 | 2/2018 | Wang et al. |

FOREIGN PATENT DOCUMENTS

| | | |
|---|---|---|
| JP | 2014-206960 A | 10/2014 |
| KR | 10-2012-0011987 A | 2/2012 |
| WO | 2017/004094 A1 | 1/2017 |
| WO | 2017004095 A1 | 1/2017 |
| WO | 2017019233 A1 | 2/2017 |
| WO | 2017116496 A1 | 7/2017 |
| WO | 2017116497 A1 | 7/2017 |
| WO | 2018022023 A1 | 2/2018 |
| WO | 2018022128 A1 | 2/2018 |
| WO | 2018/080562 A1 | 5/2018 |
| WO | 2018/080563 A1 | 5/2018 |

OTHER PUBLICATIONS

Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.
PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.

(56) References Cited

OTHER PUBLICATIONS

PCT Written Opinion of the International Search Authority for PCT/US2016/039918, Applicant: Intuit Inc., Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc., Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc., Form PCT/ISA/237, dated Oct. 11, 2016.
Office Action dated Dec. 28, 2017 in U.S. Appl. No. 14/097,057, filed Dec. 4, 2013, (10pages).
Office Action dated Jan. 12, 2018 in U.S. Appl. No. 14/462,345, filed Aug. 18, 2014, (9pages).
Office Action dated Jan. 30, 2018 in U.S. Appl. No. 14/553,347, filed Nov. 25, 2014, (40pages).
Office Action dated Dec. 12, 2017 in U.S. Appl. No. 14/698,733, filed Apr. 28, 2015, (90pages).
Response dated Feb. 12, 2018 in U.S. Appl. No. 14/698,733, filed Apr. 28, 2015, (36pages).
Advisory Action dated Feb. 16, 2018 in U.S. Appl. No. 14/698,733, filed Apr. 28, 2015, (3pages).
Response dated Jan. 3, 2018 in U.S. Appl. No. 14/448,678, filed Jul. 31, 2014, (37pages).
Advisory Action dated Feb. 5, 2018 in U.S. Appl. No. 14/448,678, filed Jul. 31, 2014, (7pages).
Office Action dated Feb. 12, 2018 in U.S. Appl. No. 14/555,553, filed Nov. 26, 2014, (40pages).
Notice of Allowability dated Dec. 22, 2017 in U.S. Appl. No. 14/529,736, filed Oct. 31, 2014, (13pages).
Office Action dated Dec. 28, 2017 in U.S. Appl. No. 14/529,798, filed Oct. 31, 2014, (61pages).
Response dated Jan. 16, 2018 in U.S. Appl. No. 14/530,159, filed Oct. 31, 2014, (13pages).
Interview Summary dated Feb. 5, 2018 in U.S. Appl. No. 14/530,159, filed Oct. 31, 2014, (3pages).
Office Action dated Jan. 12, 2018 in U.S. Appl. No. 14/755,684, filed Jun. 30, 2015, (31pages).
PCT International Preliminary Report on Patentability (Chapter I of the Patent Cooperation Treaty) for PCT/US2016/039919, Applicant: Intuit Inc., Form PCT/IB/326 and 373, dated Jan. 11, 2018, (11pages).
Response dated Feb. 15, 2018 in U.S. Appl. No. 14/206,834, filed Mar. 12, 2014, (36pages).
Interview Summary dated Feb. 15, 2018 in U.S. Appl. No. 14/206,834, filed Mar. 12, 2014, (3pages).
Response dated Jan. 5, 2018 in U.S. Appl. No. 14/555,902, filed Nov. 28, 2014, (14pages).
Response dated Dec. 8, 2017 in U.S. Appl. No. 14/555,939, filed Nov. 28, 2014, (52pages).
Office Action dated Jan. 18, 2018 in U.S. Appl. No. 14/207,121, filed Mar. 12, 2014, (22pages).
Response dated Jan. 31, 2018 in U.S. Appl. No. 14/557,335, filed Dec. 1, 2014, (26pages).
Office Action dated Feb. 9, 2018 in U.S. Appl. No. 14/462,315, filed Aug. 18, 2014, (38pages).
Notice of Allowance and Fee(s) Due dated Jan. 25, 2018 in U.S. Appl. No. 14/448,481, filed Jul. 31, 2014, (62pages).
Interview Summary dated Feb. 9, 2018 in U.S. Appl. No. 14/448,481, filed Jul. 31, 2014, (8pages).
Response dated Dec. 22, 2017 in U.S. Appl. No. 14/698,746, filed Apr. 28, 2015, (15pages).
Office Action dated Jan. 26, 2018 in U.S. Appl. No. 14/461,982, filed Aug. 18, 2014, (94pages).
Interview Summary dated Dec. 15, 2017 in U.S. Appl. No. 14/755,859, filed Jun. 30, 2015, (4pages).
PCT International Preliminary Report on Patentability (Chapter I of the Patent Cooperation Treaty) for PCT/US2016/039918, Applicant: Intuit Inc., Form PCT/IB/326 and 373, dated Jan. 11, 2018, (11pages).
Response dated Jan. 10, 2018 in U.S. Appl. No. 14/448,962, filed Jul. 31, 2014, (27pages).
Interview Summary dated Feb. 20, 2018 in U.S. Appl. No. 14/448,962, filed Jul. 31, 2014, (3pages).
Response dated Feb. 16, 2018 in U.S. Appl. No. 14/448,986, filed Jul. 31, 2014, (16pages).
Office Action dated Feb. 8, 2018 in U.S. Appl. No. 14/462,411, filed Aug. 18, 2014, (76pages).
Office Action dated Feb. 5, 2018 in U.S. Appl. No. 14/555,334, filed Nov. 26, 2014, (52pages).
Response dated Jan. 11, 2018 in U.S. Appl. No. 14/701,030, filed Apr. 30, 2015, (35pages).
Response dated Dec. 22, 2017 in U.S. Appl. No. 14/673,646, filed Mar. 30, 2015, (22pages).
Interview Summary dated Dec. 28, 2017 in U.S. Appl. No. 14/673,646, filed Mar. 30, 2015, (3pages).
Response dated Feb. 13, 2018 in U.S. Appl. No. 14/462,397, filed Aug. 18, 2014, (33pages).
Cronin, Julie-Anne et al., Distributing the Corporate Income Tax: Revised U.S. Treasury Methodology, May 2012, Department of Treasury, web, 2-31 (Year:2012) (34pages).
Notice of Allowance and Fee(s) Due dated Feb. 20, 2018 in U.S. Appl. No. 14/675,166, filed Mar. 31, 2015, (52pages).
Interview Summary dated Dec. 21, 2017 in U.S. Appl. No. 14/555,222, filed Nov. 26, 2014, (2pages).
Office Action dated Feb. 5, 2018 in U.S. Appl. No. 14/555,222, filed Nov. 26, 2014, (4pages).
Response dated Dec. 18, 2017 in U.S. Appl. No. 14/555,543, filed Nov. 26, 2014, (20pages).
Advisory Action dated Jan. 17, 2018 in U.S. Appl. No. 14/555,543, filed Nov. 26, 2014, (3pages).
Response dated Jan. 18, 2018 in U.S. Appl. No. 14/555,543, filed Nov. 26, 2014, (20pages).
Office Action dated Feb. 14, 2018 in U.S. Appl. No. 14/555,543, filed Nov. 26, 2014, (18pages).
Response dated Jan. 25, 2018 in U.S. Appl. No. 14/700,981, filed Apr. 30, 2015, (30pages).
Response dated Dec. 26, 2017 in U.S. Appl. No. 14/673,555, filed Mar. 30, 2015, (22pages).
Interview Summary dated Jan. 19, 2018 in U.S. Appl. No. 14/673,555, filed Mar. 30, 2015, (3pages).
Response dated Dec. 28, 2017 in U.S. Appl. No. 14/701,149, filed Apr. 30, 2015, (46pages).
PCT International Preliminary Report on Patentability (Chapter I of the Patent Cooperation Treaty) for PCT/US2016/039917, Applicant: Intuit, Inc., Form PCT/IB/326 and 373, dated Feb. 8, 2018 (13pages).
PCT International Search Report for PCT/US2017/062777, Applicant: Intuit Inc., Form PCT/ISA/210 and 220, dated Feb. 21, 2018 (5pages).
PCT Written Opinion of the International Search Authority for PCT/US2017/062777, Applicant: The Regents of the University of California, Form PCT/ISA/237, dated Feb. 21, 2018 (8pages).
Office Action dated Feb. 22, 2018 in U.S. Appl. No. 14/673,261, filed Mar. 30, 2015, (46pages).
Wikipedia, https://en.wikipedia.org/wiki/Data_structure, "Data Structures", Jan. 12, 2012, entire page (Year:2012) (1page).
Wikipedia, https://en.wikipedia.org/wiki/Tree_(data_structure), "Tree (data structure)", May 15, 2005, entire page (Year:2005) (1page).
Response to Rule 161 Communication dated Jan. 5, 2018 in European Patent Application No. 16843282.1, (16pages).
Communication pursuant to Rules 161(2) and 162 EPC dated Jul. 26, 2017 in European Patent Application No. 16843282.1, (2pages).
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).

(56) References Cited

OTHER PUBLICATIONS

Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Amendment and Response dated Sep. 21, 2017 in U.S. Appl. No. 14/448,481, (44pgs.).
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).
Vanderbilt University, "Free tax prep help available for Vanderbilt employees", Feb. 6, 2014, Vanderbilt University, p. 1-3.
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).

(56) References Cited

OTHER PUBLICATIONS

Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41 pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).
Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
Response dated Sep. 21, 2017 in U.S. Appl. No. 14/448,481, (44pages).
Office Action dated Sep. 14, 2017 in U.S. Appl. No. 14/530,159, (41pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snapshots/track-the-earnings—taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.

(56) References Cited

OTHER PUBLICATIONS

Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Mar. 21, 2017 in U.S. Appl. No. 14/448,481, filed Jul. 31, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Communication dated Apr. 4, 2018 in Canadian Patent Application No. 2,959,230, (6pages).
Supplementary Search Report dated Mar. 26, 2018 in European Patent Application No. 16843282.1-1217, (6pages).
Amendment and Response to Office Action for U.S. Appl. No. 14/462,345 dated Apr. 12, 2018, (15pages).
Response to Office Action for U.S. Appl. No. 14/553,347 dated Mar. 30, 2018, (26pages).
Advisory Action for U.S. Appl. No. 14/553,347 dated Apr. 13, 2018, (7pages).
Response and Request for Continued Examination for U.S. Appl. No. 14/553,347 dated Mar. 30, 2018, (41 pages).
Amendment and Response to Office Action for U.S. Appl. No. 14/673,261 dated Apr. 23, 2018, (39pages).
Advisory Action for U.S. Appl. No. 14/673,261 dated May 14, 2018, (9pages).
Amendment and Response to Office Action for U.S. Appl. No. 14/698,733 dated Mar. 30, 2018, (39pages).
Office Action for U.S. Appl. No. 14/462,058 dated Apr. 27, 2018, (47pages).
Amendment and Response to Final and Advisory Actions and Request for Continued Examination for U.S. Appl. No. 14/448,678 dated Mar. 5, 2018, (25pages).
Amendment and Response for U.S. Appl. No. 14/555,553 dated Apr. 12, 2018, (24pages).
Advisory Action for U.S. Appl. No. 14/555,553 dated Apr. 24, 2018, (3pages).
Amendment and Response to Final Office Action and Request for Continued Examination for U.S. Appl. No. 14/555,553 dated May 11, 2018, (25pages).
Amendment and Response for U.S. Appl. No. 14/529,798 dated Mar. 28, 2018, (23pages).
Response for U.S. Appl. No. 14/755,684 dated Mar. 12, 2018, (23pages).
Advisory Action for U.S. Appl. No. 14/755,684 dated Mar. 30, 2018, (2pages).
Response for U.S. Appl. No. 14/755,684 dated Apr. 4, 2018, (23pages).
Office Action for U.S. Appl. No. 14/555,902 dated May 17, 2018, (23pages).
Response for U.S. Appl. No. 14/207,121 dated Mar. 19, 2018, (34pages).
Advisory Action for U.S. Appl. No. 14/207,121 dated Apr. 6, 2018 (3pages).
Response for U.S. Appl. No. 14/462,315 dated May 9, 2018, (33pages).
Office Action for U.S. Appl. No. 14/698,746 dated Feb. 28, 2018, (14pages).
Response for U.S. Appl. No. 14/698,746 dated Apr. 30, 2018, (18pages).
Advisory Action for U.S. Appl. No. 14/698,746 dated May 15, 2018, (3pages).
Response for U.S. Appl. No. 14/462,397 dated Feb. 20, 2018, (33pages).
Response for U.S. Appl. No. 14/462,373 dated Feb. 28, 2018, (25pages).
Office Action for U.S. Appl. No. 14/755,859 dated Mar. 21, 2018, (57pages).
Response for U.S. Appl. No. 14/755,859 dated May 21, 2018, (8pages).
Response for U.S. Appl. No. 14/448,886 dated Feb. 28, 2018, (31pages).
Amendment for U.S. Appl. No. 14/448,922 dated Feb. 28, 2018, (27pages).
Office Action for U.S. Appl. No. 14/448,922 dated May 16, 2018, (41pages).
Office Action for U.S. Appl. No. 14/448,962 dated Apr. 13, 2018, (17pages).
Office Action for U.S. Appl. No. 14/448,986 dated May 11, 2018, (15pages).
Response for U.S. Appl. No. 14/462,411 dated May 8, 2018, (27pages).
Response for U.S. Appl. No. 14/555,334 dated Apr. 4, 2018, (14pages).
Advisory Action for U.S. Appl. No. 14/555,334 dated Apr. 17, 2018, (2pages).
Response for U.S. Appl. No. 14/555,334 dated May 7, 2018, (41pages).
Office Action for U.S. Appl. No. 14/673,646 dated Feb. 28, 2018, (19pages).
Response for U.S. Appl. No. 14/673,646 dated Mar. 30, 2018, (22pages).
Response for U.S. Appl. No. 14/701,087 dated Apr. 2, 2018, (41pages).
Amendment After Allowance for U.S. Appl. No. 14/675,166, (5pages).
Supplemental Notice of Allowability for U.S. Appl. No. 14/675,166, (3pages).
Response for U.S. Appl. No. 14/555,296, (23pages).
Response for U.S. Appl. No. 14/555,222, (8pages).
Office Action for U.S. Appl. No. 14/700,981, (28pages).
Office Action for U.S. Appl. No. 14/673,555, (43pages).
H.R. Gregg; Decision Tables for Documentation and System Analysis; Oct. 3, 1967; Union Carbide Corporation, Nuclear Division, Computing Technology Center; pp. 5, 6, 18, 19, & 21 (Year: 1967).
Solomon L. Pollack; Analysis of the Decision Rules in Decision Tables, May 1963; The Rand Corooration; pp. iii, iv, 1, 20, & 24 (Year: 1963).
Communication pursuant to Rules 70(2) and 70a(2) EPC dated Apr. 25, 2018 in European Patent Application No. 16843282.1-1217, (1page).
Notice of Allowance and Fee(s) Due dated May 5, 2017 in U.S. Appl. No. 14/206,682, (30pages).
PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31 pages).

\* cited by examiner

|  | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 4

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule₁ | Y | ? | ? | ? | N | ? | ? | 40% | 10% |
| Rule₂ | N | Y | Y | ? | ? | ? | N | 20% | 5% |
| Rule₃ | N | Y | N | Y | ? | N | ? | 14% | 6% |
| Rule₄ | Y | ? | ? | ? | N | Y | N | 65% | 20% |
| Rule₅ | N | Y | N | ? | ? | ? | Y | 18% | 40% |
| Rule₆ | Y | Y | N | ? | ? | N | ? | 5% | 25% |

FIG. 5

| Payroll Tax Form ID | Error | Error ID | Error Code | Correction | Date and Time | Links |
|---|---|---|---|---|---|---|
| 100001 | Mismatch between total after adjustmane and total of monthly tax | 123456789 | 9A1 | Modify total tax or monthly tax liabilities to match | 01/01/2016;8:07 | db/error/100001/123456789 |
| 100002 | Mismatch between SSN Exempt Box and SS wages | 123456790 | 9B1 | Modify exempt box or remove SSN wages | 01/01/2016;8:08 | db/error/100002/123456790 |
| 100003 | Taxable medicare wages/tips less than taxable SSN wages/tips | 123456791 | 9C1 | Modify taxable medicare wages/tips or sum of taxable SSN wages/tips | 01/01/2016;8:08 | db/error/100003/123456791 |
| 100004 | Negative amount entered for monthly tax liability | 123456792 | 9D1 | Modify monthly tax liability to be non-negative | 01/01/2016;8:09 | db/error/100004/123456792 |
| 100005 | Mismatch between box for total tax less than $2500, but total tax exceeds $2500 | 123456793 | 9F1 | Uncheck box or modify total tax | 01/01/2016;8:09 | db/error/100005/123456793 |
| 100006 | Monthly tax liability entered when total tax is less than $2500 | 123456794 | 9G1 | Remove entries for monthly tax liability or enter tax exceeding $2500 | 01/01/2016;8:09 | db/error/100005/123456793 |

FIG. 13

SYSTEMS AND METHODS FOR GENERATING AN ERROR REPORT LISTING ERRORS IN THE PREPARATION OF A PAYROLL TAX FORM

SUMMARY

Embodiments of the present invention are directed to computerized systems and methods for generating an error report listing errors and/or explanations of such errors in the computerized preparation of employer payroll tax forms for submission to the appropriate tax agencies, such as Internal Revenue Service ("IRS") forms Form 940, Form 941 and Form 944.

Many employers are required to prepare and file periodic employer payroll tax returns in order to report and pay withholding taxes for their employees to the appropriate tax agency, such as the U.S. federal tax agency, the IRS, or a state or local tax agency. Some examples of such form included IRS Form 941, entitled "Employer's QUARTERLY Federal Tax Return", IRS FORM 944, entitled "Employer's ANNUAL Federal Tax Return", and IRS Form 940, entitled "Employer's Annual Federal Unemployment (FUTA) Tax Return."

In order to facilitate the completion of employer payroll tax forms, computerized payroll tax form preparation software has been developed to assist employers and/or payroll service providers in preparing the payroll tax forms. The computerized payroll tax form preparation software is configured to prepare electronic payroll tax forms which may be electronically submitted to the appropriate tax agency, and/or to print the completed payroll tax forms which can then be mailed, or otherwise delivered, to the tax agency.

Accordingly, one embodiment of the present invention is directed to a system for generating an error report which includes errors and/or error explanations generated in the computerized preparation of a payroll tax form to be submitted to an appropriate tax agency. The payroll system may be implemented on and/or within a computerized payroll tax form preparation system (referred to as a "payroll system") for preparing a payroll tax form to be submitted to a tax agency. The payroll system includes a computing device having a computer processor and memory. The system further includes a data store in communication with the computing device. The data store is configured to store employer-specific payroll data for a plurality of tax data fields. For example, the payroll system may access employer-specific payroll data from any suitable source, such as a financial accounting system like QUICKBOOKS®, available from INTUIT® INC. of Mountain View, Calif. The tax data fields may include input data required for completing the payroll tax form, such as the Employer Identification Number (EIN), employer name and address, wages, tips and compensation paid to employees, federal income tax withheld from the employees, taxable social security wages and tips, taxable Medicare wages and tips, adjustments, etc.

The payroll system includes a payroll tax form preparation software application executable by the computing device. The tax form preparation software application has a payroll calculation engine, an error check engine and one or more error graphs. Each error graph semantically describes data dependent operations comprising a plurality of interconnected nodes including one or more of input nodes, function nodes, and/or functional nodes, configured to be processed by the error check engine to determine errors in the payroll tax form.

The payroll calculation engine is configured to read the employer-specific tax data from the shared data store, perform a plurality of payroll calculation operations and write calculated payroll data for a plurality of payroll data fields to the shared data store.

The error check engine is configured to read the tax data and payroll data from the shared data store and process each of the error graph(s) to identify one or more errors.

The payroll system is configured to compile a plurality of errors identified by the error check engine into an error report. The error check engine, or other module may be configured to generate the error report. The error report may be in any suitable form, such as a log file, an email, web page configured for display on a web browser, and/or an electronic document. The error report may compile the errors in a raw format as identified by the error check engine, or it may compile the narrative explanations and/or even more detailed explanations as generated by the explanation engine. The report may be as simple as a log file, or it may be an email, or an electronic document like a pdf or MICROSOFT WORD® file. The report could also be a web page configured for display on a web browser and made accessible via the internet. The error check engine 150 may also transmit the errors to a user interface manager and/or user interface controller which can then display the errors to a user, and/or utilize the errors in the process of data entry.

In another aspect of the present invention, the payroll system may be configured to generate explanations of the errors identified by the error check engine. One or more of the nodes of the error graph(s) is associates with one or more respective error explanations. Each node may be associated with a respective error explanation, or a plurality of error explanations (e.g., a single node may have multiple error explanations, such as a general explanation and additional more detailed explanations which allow a user to drill down on an error). The payroll system further comprises an error explanation engine which is configured to generated narrative explanations from the one or more error explanations associated with one or more nodes of the error graph(s) related to the identified errors.

In still another aspect, the explanation engine may include a natural language generator which converts error explanations comprising fragments, expressions and/or partial statements into natural language expressions. This allows the error explanations to be easily understood by a user of the system or an agent operating the system of a payroll service provider for an employer.

In yet another aspect, the payroll system may be configured to automatically generate the narrative explanations, or alternatively, to only generate the narrative explanations in response to user request.

In still another aspect, the payroll tax form preparation software application may utilize a construct in which the rules and calculations for preparing the payroll tax form are established in declarative data structures in the form of a payroll calculation graph. The payroll calculation graph comprises a plurality of interconnected calculation nodes including one or more input nodes, function nodes, and/or functional nodes. In addition, the payroll calculation engine is configured to perform the plurality of payroll calculation operations based on the payroll calculation graph.

Another embodiment of the present invention is directed to computer-implemented methods for and/or generating error explanations in the computerized preparation of a payroll tax form to be submitted to an appropriate tax agency utilizing the system described above. For instance, the method may include a payroll system, same or similar to that described above, executing a payroll tax form preparation software application. The payroll calculation engine reads the employer-specific tax data from the shared data store, performs a plurality of payroll calculation operations, and writes calculated payroll data for a plurality of payroll data fields to the shared data store. The error check engine accesses the tax data and payroll data from the shared data store and processes the error graph(s) to identify one or more errors in the preparation of the payroll tax form.

In additional aspects of present invention, the computer-implemented method may include any of the additional aspects described herein for the system for identifying errors and/or explaining errors in the computerized preparation of a payroll tax form.

Another embodiment of the present invention is directed to an article of manufacture comprising a non-transitory computer readable medium embodying instructions executable by a computer to execute a process according to any of the method embodiments of the present invention for identifying errors in the preparation of an electronic payroll tax form to be submitted to a tax agency using a payroll system. For example, the process may comprise the payroll system executing a payroll tax form preparation software application, as described above. The payroll calculation engine reads the employer-specific tax data from the shared data store, performs a plurality of payroll calculation operations based on the payroll calculation graph, and writes calculated payroll data for a plurality of payroll data fields to the shared data store. The error check engine accesses the tax data and payroll data from the shared data store and processes the error graph(s) to identify one or more errors in the preparation of the payroll tax form.

In additional aspects of present invention, the process of the article of manufacture may include any of the additional aspects described herein for the system and methods for identifying errors and/or explaining errors in the computerized preparation of a payroll tax form.

The use of calculation graphs and error graphs allows the payroll system to process and calculate a high volume of payroll tax forms being prepared concurrently, or in short succession. The calculation graphs and error graphs allow for more efficiently utilizing the computing power of the system by optimizing the number of questions required to be asked to obtain all of the required tax data for preparing a respective payroll tax form and only requiring those calculations which are relevant to each respective payroll tax form. These features increase the flexibility of the system, increase the speed of calculations resulting in faster calculations and reduced computer processing time, and require less memory resources when preparing and calculating a payroll tax form. Especially when preparing and calculating high volumes of payroll tax form, such as hundreds, thousands, millions or more per time period, such as a day, week or month, the payroll system of the present invention significantly improves the operation of the computer, while also improving various technologies and/or technical fields, including computerized preparation of forms, computerized calculation of forms, and computerized financial management systems. Accordingly, the present invention is rooted in computer technology involving specific computer components, intercommunications between computing modules, data structures and logic structures which improve the operation of the computer and also improve the technologies and technical fields recited above.

BRIEF DESCRIPTION OF THE DRAWINGS

FIG. 4 illustrates a decision table based on or derived from the completeness graph of FIG. 3, according to one embodiment of the present invention.

FIG. 5 illustrates another embodiment of a decision table that incorporates statistical data, according to one embodiment of the present invention.

FIG. 13 illustrates an example of an error report, according to one embodiment of the present invention.

DETAILED DESCRIPTION OF ILLUSTRATED EMBODIMENTS

Figure 1:
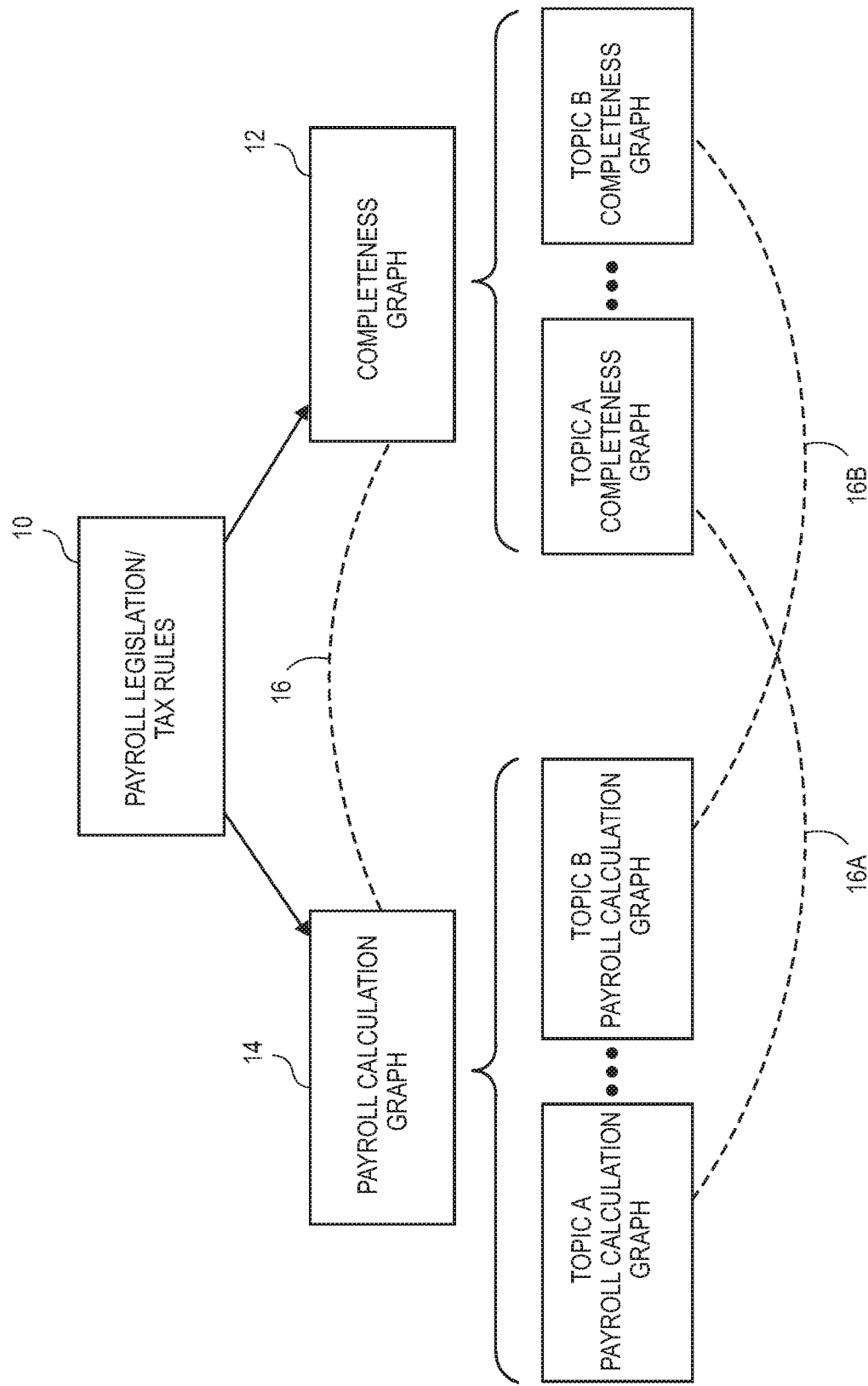
FIG. 1 schematically illustrates how payroll tax form rules are parsed and represented by a completeness graph and a tax calculation graph, according to one embodiment of the present invention.

Embodiments of the present invention are directed to systems, methods and articles of manufacture for generating an error report which lists errors and/or error explanations identified and generated in the computerized preparation of a payroll tax form to be submitted to a tax agency, such as IRS Forms 940, 941 and 944, or any other suitable payroll tax form. The embodiments are typically implemented on a computerized payroll tax form preparation system (also referred to as a "payroll system") configured to access payroll related tax data of an employer, perform calculations to obtain calculated payroll data for preparing a tax form, identify errors and/or generate error explanations in the preparation of the tax form, and then prepare the tax form for submission to the tax agency. The payroll system includes one or more error graphs which each semantically describe data dependent operations comprising a plurality of interconnected nodes including one or more of input nodes, function nodes, and/or functional nodes, configured to be processed by the error check engine to determine errors in the payroll tax form. The payroll system has an error check engine which is configured to process the error graph(s) using the tax data and payroll data to identify errors in the preparation of the payroll tax form. The error check engine is further configured to compile a plurality of errors and/or explanations of the errors into an error report listing each of the errors and error data regarding each of the errors. The payroll system may further include an explanation engine configured to generate narrative explanations for the errors identified by the error check engine.

The computerized payroll system of the present invention utilizes an new and innovative configuration that operates on a new construct in which payroll tax rules and the calculations based thereon are established in declarative data-structures, namely, one or more graphs completeness and one or more tax calculation graphs. Use of these data-structures permits a user interface to be loosely connected or even divorced from the calculation engine and the data used in the tax calculations. Payroll tax calculations are dynamically calculated based on tax data derived from sourced data, estimates, user input, or even intermediate calculations that are then utilized for additional payroll tax calculations. A smart logic agent running on a set of rules can review current run time data and evaluate missing data fields and propose suggested questions to be asked to a user to fill in missing blanks. This process can be continued until completeness of all payroll tax topics has occurred. The system can then prepare and file a completed electronic payroll tax form with the appropriate tax agency, or print a completed payroll tax form for submission to the submission to the appropriate tax agency, or taxing jurisdictions. These declarative data structures improve the flexibility of the computing system, increase the speed of calculations resulting in faster calculations of a payroll tax form and reduced computer processing time, and require less memory resources in preparing and calculating a payroll tax form.

FIG. 1 illustrates graphically how payroll tax rules 10 are broken down into a completeness graph 12 and a tax calculation graph 14. In one aspect of the invention, payroll tax rules 10 are parsed or broken into various topics. For example, there a number of payroll topics that need to be covered for completing a federal tax return. When one considers both federal and state payroll tax forms, there are even more potentially relevant payroll topics. When payroll tax 10 are broken into various topics or sub-topics, in one embodiment of the invention, each particular topic (e.g., topics A, B) may each have their own dedicated completeness graph 12A, 12B and payroll calculation graph 14A, 14B as seen in FIG. 1.

Note that in FIG. 1, the completeness graph 12 and the payroll calculation graph 14 are interdependent as illustrated by dashed line 16. That is to say, some elements contained within the completeness graph 12 may be needed to perform actual payroll calculations using the payroll calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a payroll tax form that can be filed for an employer. The completeness graph 12, for example, determines when all conditions have been satisfied such that a "fileable" payroll tax form can be prepared with the existing data. The completeness graph 12 is used to determine, for example, that no additional data input is needed to prepare and ultimately print or file a tax return. The completeness graph 12 is used to determine when a particular schema contains sufficient information such that a payroll tax form can be prepared and filed. Individual combinations of completeness graphs 12 and payroll calculation graphs 14 that relate to one or more topics can be used complete the computations required for some sub-calculation. In the context of a payroll tax form, for example, a sub-selection of topical completeness graphs 12 and tax calculation graphs 14 can be used for intermediate tax results such as total taxes before adjustments, adjustments, total taxes after adjustments, and the like.

Figure 2:
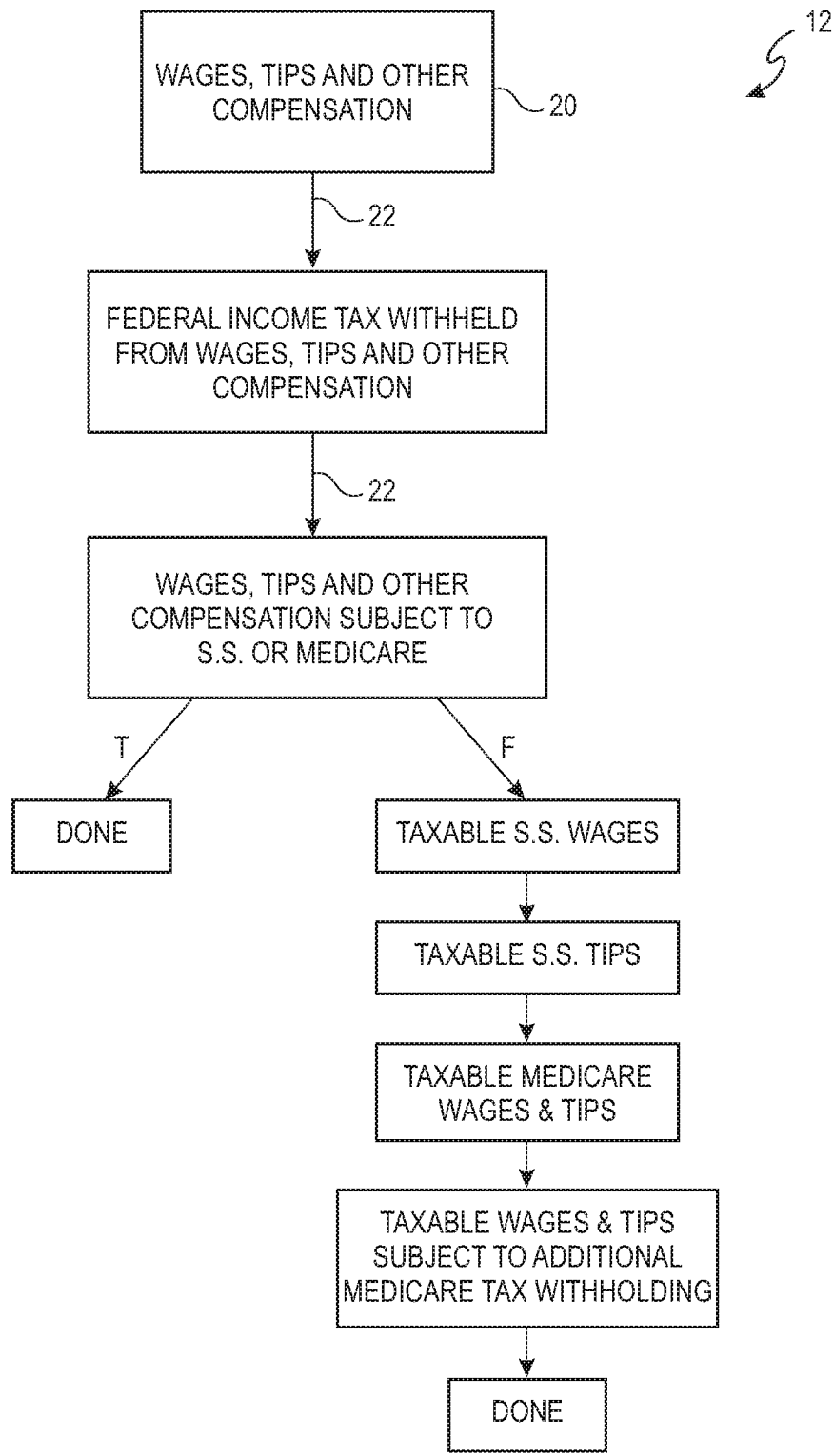
FIG. 2 illustrates an example of a simplified version of a completeness graph related to determining total taxes before adjustments on IRS Form 944, according to one embodiment of the present invention.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining total taxes before adjustments for IRS Form 944. Each node 20 contains a tax data field or a condition that needs to be completed with data or an answer in order to complete the topic. The arcs 22 that connect each node 20 may illustrate the dependencies between nodes 20, or simply a flow of data requirements. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion.

Figure 3:
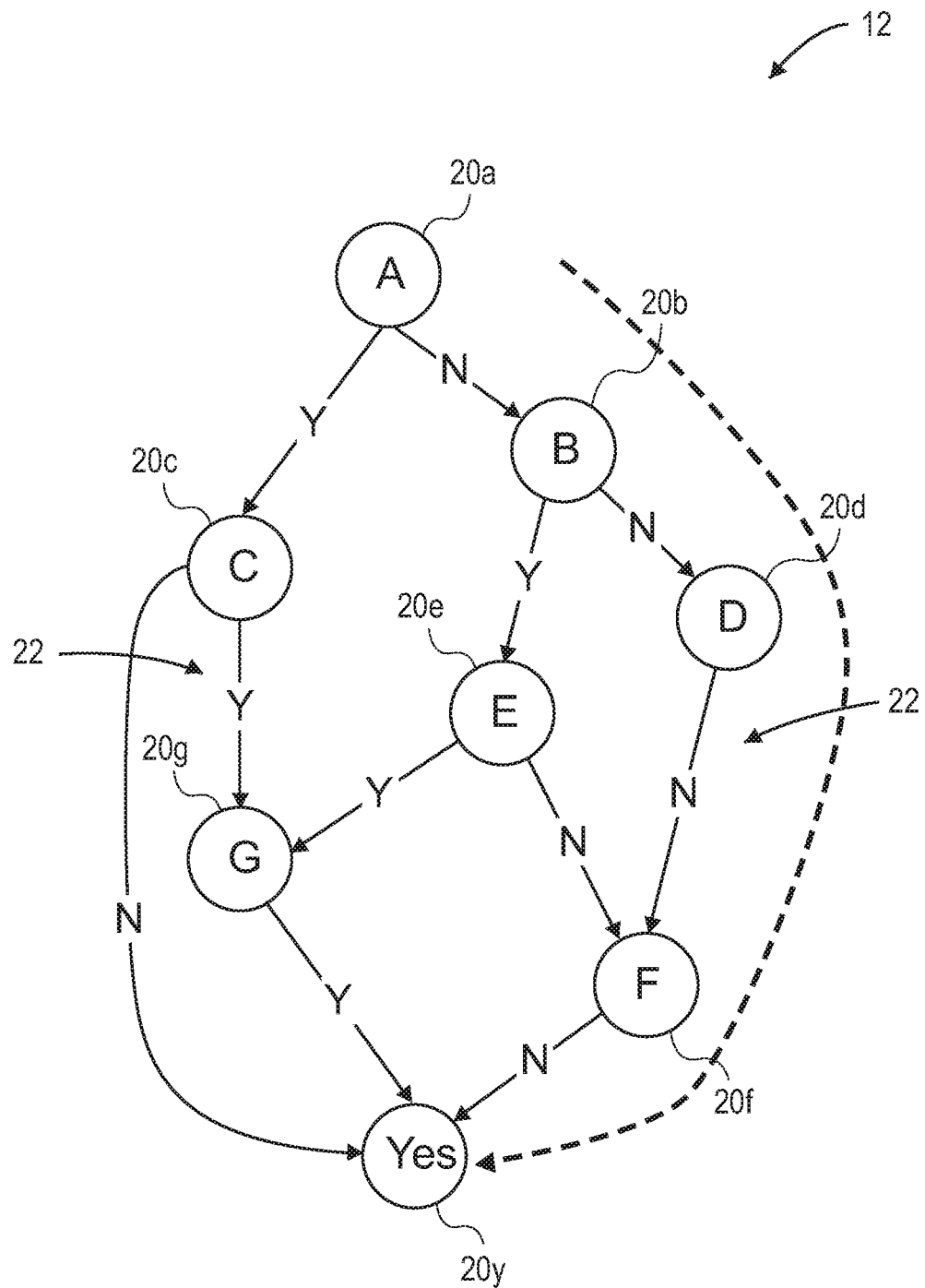
FIG. 3 illustrates another illustration of a completeness graph, according to one embodiment of the present invention.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner one can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of payroll tax form preparation software 100, or to simply access the needed tax data and answers from a data source, such as a financial accounting software application or database. In particular, the decision table 30 is used to select a question or questions to present to a user during an interview process, or to access a particular data field from a database. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The payroll tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After in initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_C$ and $Q_G$ in columns 34c, 34g, respectively. One of these questions is selected and the process repeats until either the goal 34h is reached or there is an empty candidate list.

Figure 5:
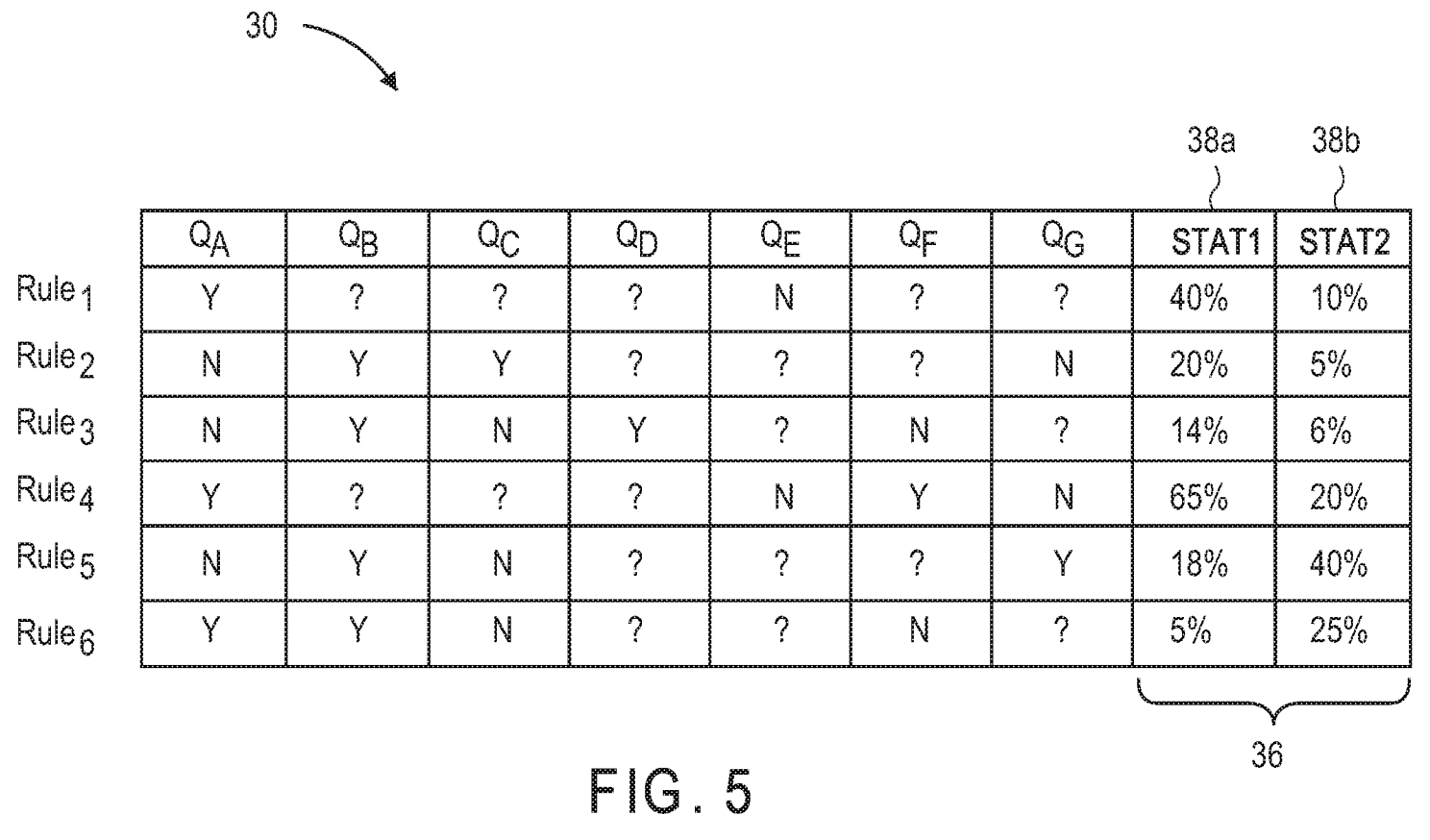

FIG. 5 illustrates another embodiment of a decision table 30. In this embodiment, the decision table 30 includes additional statistical data 36 associated with each rule (e.g., rules R1-R6). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by INTUIT® INC. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates employers having under a certain number of employees where $Rule_1$ is satisfied. Column 38b (STAT2) may contain a percentage value that indicates employers having over a certain number of employees where $Rule_1$ is satisfied. Any number of additional columns 38 could be added to the decision table 30 and the statistics do not have to relate to the number of employees. The statistical data 36 may be used, as explained in more detail below, by the payroll tax form preparation software 100 to determine which of the candidate questions ($Q_A$-$Q_G$) should be asked for a particular employer. The statistical data 36 may be compared to one or more known employer data fields (e.g., number of employees, filing status, geographic location, or the like) such that the question that is presented to the user is most likely to lead to a path to completion. Candidate questions may also be excluded or grouped together and then presented to the user to efficiently minimize payroll tax interview questions during the data acquisition process. This optimization improves the operation of the computing system, and also increases the speed and efficiency in obtaining tax data for preparing and calculating a payroll tax form. For example, questions that are likely to be answered in the negative can be grouped together and presented to the user in a grouping and asked in the negative—for example, "we think these questions do not apply to you, please confirm that this is correct." This enables the elimination of many pathways to completion that can optimize additional data requests of the taxpayer.

Figure 6:
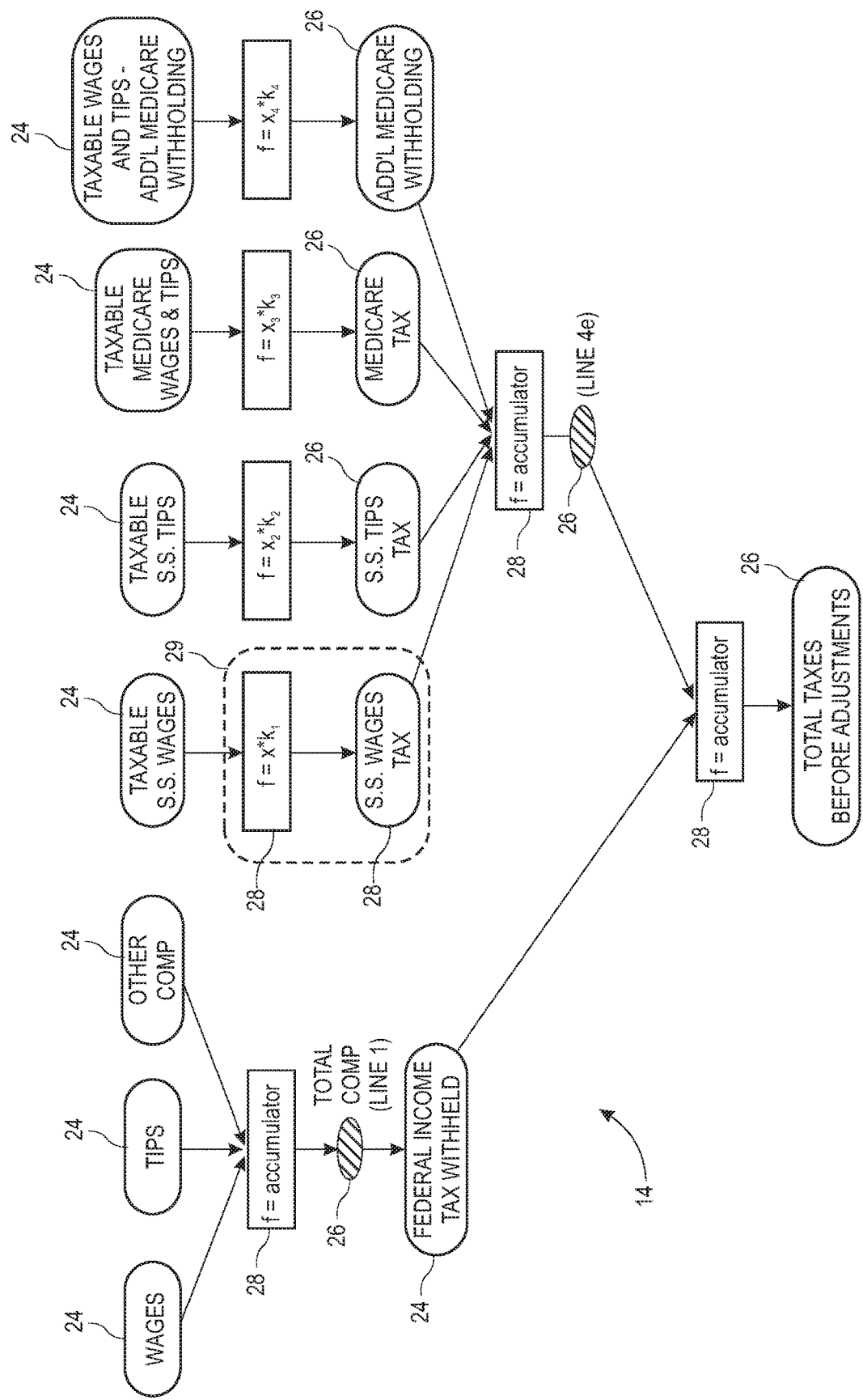
FIG. 6 illustrates an example of a payroll calculation graph, according to one embodiment of the present invention.

FIG. 6 illustrates one example of a payroll calculation graph 14. The payroll calculation graph 14 semantically describes data dependent payroll tax operations that are used perform payroll calculation operations in accordance with the payroll tax rules 10. The payroll calculation graph 14 in FIG. 6 is a view of data dependent payroll tax operations that are used to determine the total taxes before adjustments, line 5 for IRS Form 944 for 2015. The payroll calculation graph 14 is a type of directed graph and, in most situations relevant to payroll calculations, is a directed acyclic graph that encodes the data dependencies amongst payroll concepts or topics.

In FIG. 6, various nodes 24 are leaf or input nodes. Examples of leaf nodes 24 in this particular example include data obtained from payroll data, such as from a financial accounting software application, like QUICKBOOKS®, or other database of payroll data. Typically, though not exclusively, leaf nodes 24 are populated with data accessed from a payroll program or from user inputs. For user inputs, the user may enter the data via a user interface as described herein. In other embodiments, however, the leaf nodes 24 may be populated with information that is automatically obtained by the payroll tax form preparation software 100. For example, in some embodiments, payroll documents may be imaged or scanned with relevant data being automatically extracted using Object Character Recognition (OCR) techniques. In other embodiments, prior payroll tax forms may be used by the payroll system to extract information (e.g., employer name, address, EIN, etc.) which can then be used to populate the leaf nodes 24. Online resources such as financial services websites or other employer-specific websites can be crawled and scanned to scrape or otherwise download payroll tax data that can be automatically populated into leaf nodes. In still other embodiments, values for leaf nodes 24 may be derived or otherwise calculated.

Still other internal nodes referred to as functional nodes 26 semantically represent a payroll tax form concept, such as a payroll tax form line item and may be calculated or otherwise determined using a function 28. The functional node 26 and the associated function 28 define a particular tax operation 29. For example, as seen in FIG. 6, operation 29 refers to tax due for social security wages and is the result of the multiplication function 28 which multiplies the social security wages ($X_1$) from leaf node 24 times a tax rate constant ($K_1$). The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific payroll tax operation as part of the payroll tax topic.

Interconnected function nodes 26 containing data dependent tax concepts or topics are associated with a discrete set of functions 28 that are used to capture domain specific patterns and semantic abstractions used in the payroll tax calculation. The discrete set of functions 28 that are associated with any particular function node 26 are commonly reoccurring operations for functions that are used throughout the process of calculating tax liability. For example, examples of such commonly reoccurring functions 28 include copy, capping, thresholding (e.g., above or below a fixed amount), accumulation or adding, look-up operations (e.g., look-up tax tables), percentage of calculation, phase out calculations, comparison calculations, exemptions, exclusions, and the like.

In some embodiments, the function 28 may also include any number of mathematical or other operations. Examples of functions 28 include summation, subtraction, multiplication, division, and comparisons, greater of, lesser of, at least one of, calling of look-ups of tables or values from a database or library. It should be understood that the function nodes 26 in the tax calculation graph 14 may be shared in some instances.

The use of calculation graphs 14 which are loosely connected or even separated from the calculation engine and the data used in the tax calculations increases the flexibility of the computing system separate from the 123

Figure 7:
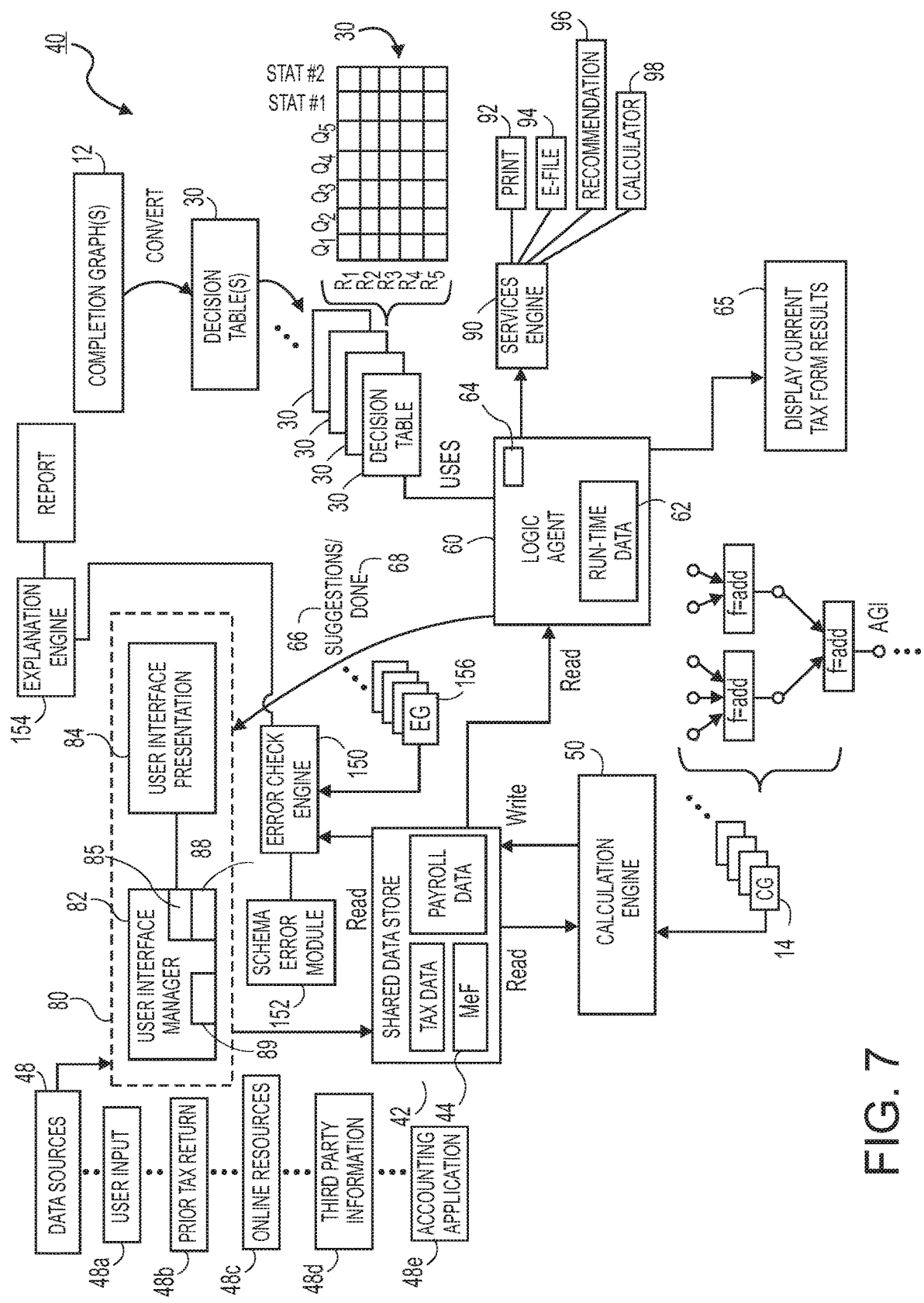
FIG. 7 schematically illustrates a payroll system for calculating a payroll tax form using rules and calculations based on calculation graphs and identifying errors using a schema error module and/or error graphs, according to one embodiment of the present invention.

FIG. 7 schematically illustrates a payroll system 40 for calculating a payroll tax form using rules and calculations based on a declarative data structures according to one embodiment. The system 40 include a shared data store 42 that contains therein a schema 44 or canonical model representative to the tax data fields (typically, fields for the input data values for preparing a payroll tax form) and the calculated payroll data fields (the fields for the payroll data calculated using the tax data) utilized or otherwise required to complete a payroll tax form. The shared data store 42 may be a repository, file, or database that is used to contain the payroll tax-related data fields. The shared data store 42 is accessible by a computing device 102, 103 as described herein (e.g., FIG. 11). The shared data store 42 may be located on the computing device 102, 103 running the payroll tax form preparation software 100 or it may be located remotely, for example, in a cloud environment on another, remotely located computer. The schema 44 may include, for example, a schema based on the Modernized e-File (MeF) system developed by the Internal Revenue Service. MeF uses extensible markup language (XML) format that is used when identifying, storing, and transmitting data. For example, each line or data element on a payroll tax form is given an XML name tag as well as every instance of supporting data. The payroll tax form preparation software 100 uses XML schemas and business rules to electronically prepare and transmit payroll tax form to the appropriate tax agencies. The IRS validates the transmitted files against the XML schemas and Business Rules in the MeF schema 44.

As seen in FIG. 7, the shared data store 42 may import data from one or more data sources 48. A number of data sources 48 may be used to import or otherwise transfer employer tax related data to the shared data store 42. This may occur through a user interface manager 80 as described herein or, alternatively, data importation may occur directly to the shared data store 42 (not illustrated in FIG. 7). The tax related data may include employer identification data such as a name, address, and taxpayer ID (EIN).

It is contemplated that the primary source of employer payroll tax data will be accessed from a financial accounting application 48e The financial accounting system 48e may be any suitable financial accounting application, such as QUICKBOOKS®, available from INTUIT® INC. of Mountain View, Calif. The payroll tax data may be electronically transferred to the payroll system 40 via the user interface manager 80, or directly to the shared data store 42, as described above User input 48a is also one type of data source 48. User input 48a may take a number of different forms. For example, user input 48a may be generated by a user using, for example, a input device such as keyboard, mouse, touchscreen display, voice input (e.g., voice to text feature), photograph or image, or the like to enter information manually into the payroll tax form preparation software 100. For example, as illustrated in FIG. 7, user interface manager 82 contains an import module 89 that may be used to select what data sources 48 are automatically searched for payroll tax related data. Import module 89 may be used as a permission manager that includes, for example, user account numbers and related passwords. The UI control 80 enables what sources 48 of data are searched or otherwise analyzed for tax related data. For example, a user may select prior year tax returns 48b to be searched but not online resources 48c. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question or prompt may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48a may also include some form of automatic data gathering. For example, a user may scan or take a photographic image of a tax document (e.g., prior IRS Form 944, W-2, etc.) that is then processed by the payroll tax form preparation software 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior payroll tax form 48b. A prior payroll tax form 48b that is stored electronically can be searched and data is copied and transferred to the shared data store 42. The prior payroll tax form 48b may be in a proprietary format (e.g., .txf, .pdf) or an open source format. The prior payroll tax form 48b may also be in a paper or hardcopy format that can be scanned or imaged whereby data is extracted and transferred to the shared data store 42. In another embodiment, a prior year tax return 48b may be obtained by accessing a government database (e.g., IRS records).

An additional example of a data source 48 is an online resource 48c. An online resource 48c may include, for example, websites for the employer that contain tax-related information. For example, financial service providers such as banks, credit unions, brokerages, investment advisors typically provide online access for their customers to view holdings, balances, transactions.

Still referring to FIG. 7, another data source 48 includes sources of third party information 48d that may be accessed and retrieved. For example, other tax agencies may have employer tax data useful in preparing the payroll tax form.

Figure 11:
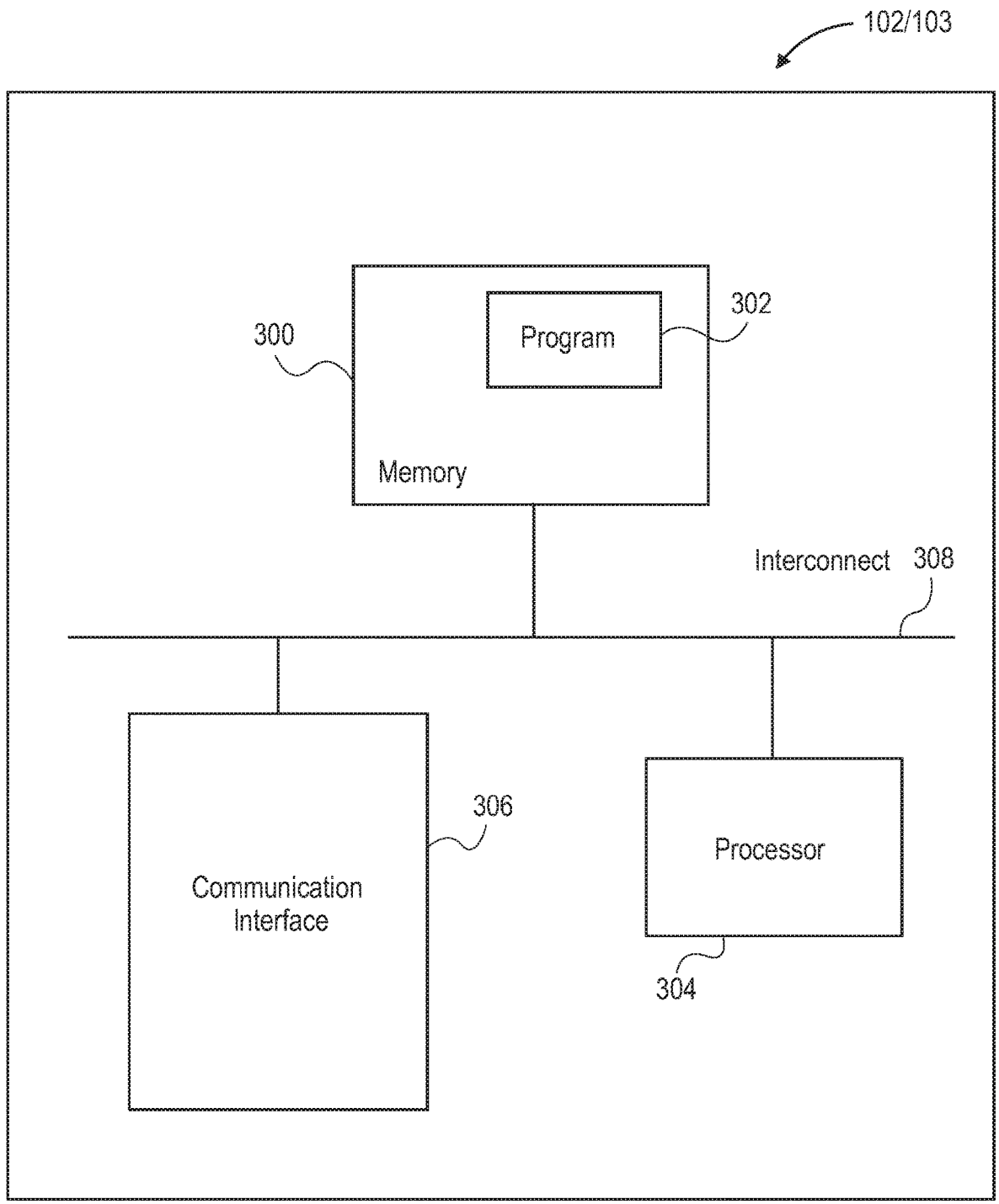
FIG. 11 illustrates generally the components of a computing device that may be utilized to execute the software for automatically calculating or determining tax liability and preparing a tax return based thereon, according to one embodiment of the present invention.

Referring briefly to FIG. 11, the payroll tax form preparation software 100 including the system 40 of FIG. 7 is executed by the computing device 102, 103. Referring back to FIG. 7, the payroll tax form preparation software 100 includes a payroll calculation engine 50 that performs one or more payroll calculations or operations based on the available employer tax data at any given instance within the schema 44 in the shared data store 42. The payroll calculation engine 50 may calculate the total balance due from the employer, the total taxes before adjustments, the current year's adjustments, the total deposits for the year, overpayment amount, or one or more intermediary calculations The payroll calculation engine 50 utilizes the one or more calculation graphs 14 as described previously in the context of FIGS. 1 and 6. In one embodiment, a series of different calculation graphs 14 are used for respective payroll tax topics. These different calculation graphs 14 may be coupled together or otherwise compiled as a composite calculation graph 14 to obtain a balance due or amount of overpayment based on the information contained in the shared data store 42. The tax calculation engine 50 reads the most current or up to date information contained within the shared data store 42 and then performs payroll calculations. Updated payroll calculation values are then written back to the shared data store 42. As the updated payroll calculation values are written back, new instances 46 of the canonical model 46 are created.

Still referring to FIG. 7, the system 40 may also include a tax logic agent (TLA) 60. The TLA 60 operates in conjunction with the shared data store 42 whereby updated employer tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form a Drools expert engine. Other declarative rules engines 64 may be utilized and a Drools expert rule engine 64 is provided as one example of how embodiments may be implemented. The TLA 60 may be implemented as a dedicated module contained within the payroll tax form preparation software 100.

As seen in FIG. 7, The TLA 60 uses the decision tables 30 to analyze the run time data 62 and determine whether a tax form is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, which, as explained in more detail below presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing of compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80: Rule engine (64)/Tax Logic Agent (TLA) (60)

```
// initialization process
Load_Tax_Knowledge_Base;
Create_Fact_Cache; While (new_data_from_application)
Insert_data_into_fact_cache;
   collection=Execute_Tax_Rules; // collection is all the
      fired rules and corresponding conditions
   suggestions=Generate_suggestions (collection);
send_to_application(suggestions);
```

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102, 103 (seen, for example, in FIG. 11). The computing device 102 may include the display of a computer, laptop, tablet, mobile phone (e.g., Smartphone), or the like. Different user interface presentations 84 may be invoked using a UI generator 85 depending, for example, on the type of display 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, is responsible for resolving of how to respond to the incoming non-binding suggestions 66. For this purpose, the suggestion resolution element 88 may be programmed or configured internally. Alternatively, the suggestion resolution element 88 may access external interaction configuration files.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may be include pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on-the-fly during runtime.

Alternatively, the user interface presentation 84 may comprise a "forms mode" which presents fillable form fields for the user to enter the payroll tax data required for preparing the payroll tax form. The forms mode may present the fillable form fields within a representation of the payroll tax form being prepared, or in any other suitable presentation. The user interface manager 82 may highlight or otherwise emphasize the fillable form fields based on the suggestions 66 from the TLA 60, such as by numbering the fillable form fields based upon the order or sequence of the suggestions 66 from the TLA 60.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the payroll tax form preparation software 100 using an input device that is associated with the computing device 102, 103. For example, a taxpayer may use a mouse, finger tap, keyboard, stylus, voice entry, or the like to respond to questions. The user may also be asked not only to respond to questions but also to include dollar amounts, check or un-check boxes, select one or more options from a pull down menu, select radio buttons, or the like. Free form text entry may also be requested of the user.

Still referring to FIG. 7, in one aspect, the TLA 60 may output a current tax form result 65 which can be reflected on a display 104 of a computing device 102, 103. For example, the current tax form result 65 may illustrate a balance due or an overpayment amount. The current tax form results 65 may also illustrate various other intermediate calculations or operations used to calculate the tax form.

The TLA 60 may also output completed payroll tax form data that is used to generate the actual completed payroll tax form (either electronic tax form or paper tax form). The payroll tax form itself can be prepared by the TLA 60 or at the direction of the TLA 60 using, for example, the services engine 90 that is configured to perform a number of tasks or services for the system provider. For example, the services engine 90 can include a printing option 92. The printing option 92 may be used to print a copy of a payroll tax form, tax data and payroll data, summaries of such data, error reports (as described below), and the like. The services engine 90 may also electronically file 94 or e-file a payroll tax form with the appropriate tax agency (e.g., federal or state tax agency). Whether a paper or electronic payroll tax form filed, data from the shared data store 42 required for particular payroll tax forms, is transferred over into the desired format. With respect to e-filed payroll tax forms, the payroll tax form may be filed using the MeF web-based system that allows electronic filing of payroll tax forms via the Internet. Of course, other e-filing systems may also be used other than those that rely on the MeF standard.

Still referring to FIG. 7, the payroll system 40 includes an error check engine 150 and a schema error module 152 for identifying errors in the preparation of a payroll tax form using the payroll system 40. The schema error module 152 includes a plurality of error rules wherein each error rule is associated with a particular tax data field or a payroll data field. Each error rule comprises meta data which is configured to be usable by the error check engine 150 to check a data value for a respective data field and determine whether it conforms to the schema requirements for the particular payroll tax form being prepared as promulgated by the tax agency. The meta data for each error rule is generated from the tax agency's schema requirements. The error check engine 150 is configured to read/access the tax data and payroll data from the shared data store 44 and check such data against the error rules for the respective data fields to identify one or more errors in the preparation of the payroll tax form. For instance, the error rules may include meta data configured to check for errors in the formatting of the tax data and payroll data in respective tax data fields and payroll data fields. As several examples, an error rule may check that the value for the EIN is only numbers and 9 digits; an error rule may check that the wages, tips and other compensation is only a positive number, an error rule may check that the ZIP code includes only 5 numbers or 9 numbers, an error rule may check that the state includes a valid two letter state code, etc. If the error check engine 150 determines that a data value does not conform to the requirements of the error rule, then the error check engine 150 flags the error and creates an error record which identifies the error.

In order to provide a more human understandable explanation of errors according to the error rules, each of the error rules may also have a schema error explanation associated with the error rule. The schema error explanation may include a narrative explanation, fragments, expressions, and/or partial statements. The error check engine 150 is further configured to utilize the schema error explanation to generate a narrative explanation of errors identified according to a particular error rule. For instance, a schema error explanation associated with an error rule for checking the format of an EIN may be a complete sentence such as "The EIN must include only numbers and 9 digits." The schema error explanation may be a template having fillable fields and the error check engine 150 may be configured to provide the explanation as well as providing a description of the specific erroneous input, such as "The EIN must include only numbers and 9 digits, and the value provided is __-_____" wherein the error check engine 150 is configured to fill in the blanks with actual value input to the payroll system 40. The error explanation may also include a recommendation or requirement for correcting the error. In the EIN example, the recommendation may state something like, "You must enter 9 numbers, and no other characters."

The errors identified by the error check engine 150 and the explanations generated by the error check engine 150 may be compiled into a report for use by a user, such as an agent of a service provider utilizing the payroll system 40 to prepare payroll tax forms for the employer. The report may be as simple as a log file, or it may be an email, or an electronic document like a pdf or MICROSOFT WORD® file. The report could also be a web page configured for display on a web browser and made accessible via the internet. The error check engine 150 may also transmit the errors to the UI controller 80 which can then display the errors to a user, and/or utilize the errors in the process of data entry via the UI manager 82.

The error check engine 150 can identify errors on a field level or entry level as the data is being accessed and/or input into the payroll system 40. Thus, it does not have to be executed on an entire payroll tax form. Moreover, the error check engine 150 can check for errors using the error rules in the schema error module 152 as the data is being input, such as being typed in by a user. In such case, the error check engine 150 and/or UI manager 82 can be configured to block entry of invalid data or display an error message when a user attempts to enter data which does not conform to the applicable error rule.

Still referring to FIG. 7, instead of the error check engine 150 generating explanations, the payroll system may have a separate explanation engine 154 which is configured to receive the errors identified by the error check engine 150 and then generate error explanations and/or an error report, same or similar to those described above. The explanation engine 154 can also transmit the error explanations to the UI controller 80 which can then display the explanations to a user, and/or utilize the errors in the process of data entry via the UI manager 82. The explanation engine 154 may be configured to utilize the narrative explanation, fragments, expressions, and/or partial statements of the error explanations to generate natural language expressions that are more easily understood by a user. The natural language expressions may or may not be complete sentences but they provide additional contextual language to the more formulaic, raw explanations that may be tied directly to the explanation associated with a function node 26 and associated function 28.

Figure 8:
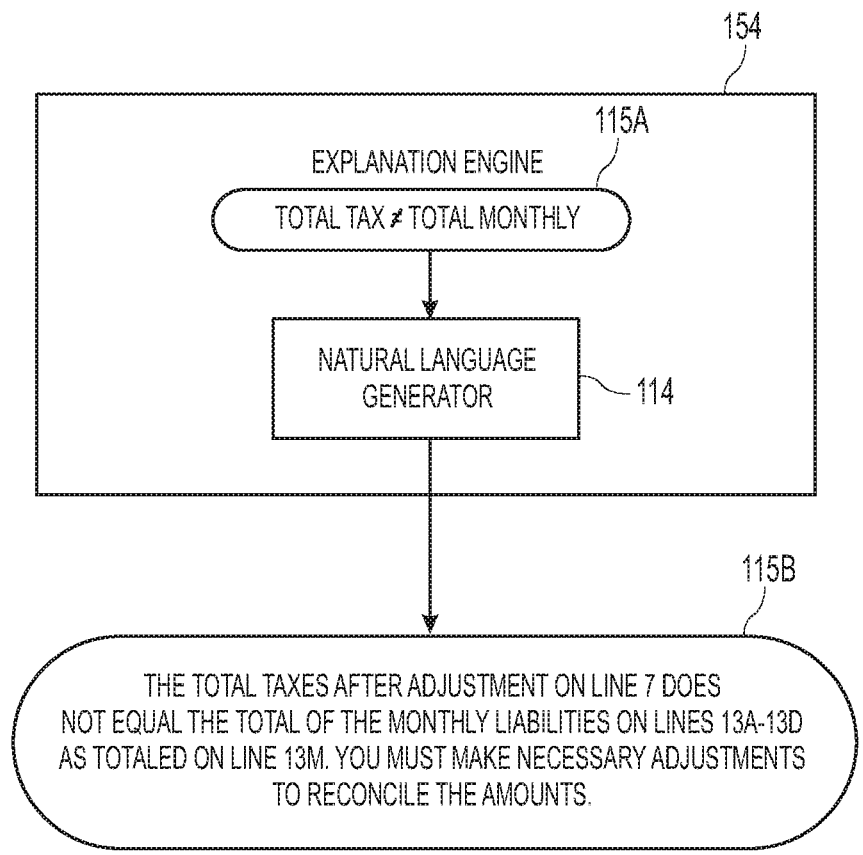
FIG. 8 illustrates an explanation engine for generating error explanations, according to one embodiment of the present invention.

FIG. 8 illustrates additional details of the explanation engine 154, according to one embodiment of the invention. In the example of FIG. 8, a brief explanation 115A extracted by the explanation engine 110 indicates that the total tax after adjustments does not equal the total monthly tax liabilities. In this example, the user is also provided with a natural language explanation 115B that is more readily understood by users which is generated by a natural language generator 114. The natural language generator 114 may utilize artificial intelligence or machine learning such that results may be improved.

The explanation engine 154 may also be configured to generate additional, more detailed narrative explanations in response to user prompts. For instance, each of the error rules may be associated with a respective error explanation, or plurality of error explanations such that a single error rule has multiple error explanations, such as a general explanation and additional more detailed explanations. The explanation engine 154 may display the general explanation along with user prompts (e.g., selection buttons, hyperlinks, etc. may be used to allow the user to select them) which the user can select in order to view additional more detailed explanations. This allows a user to drill down on an error to view more detailed explanations.

XXX Complex error detection (more complex than schema errors In another optional feature for identifying errors and generating error explanations, the payroll system 40 may be configured to utilize the declarative-data structure construct in the form of error graphs 156 to identify more complex errors than the schema errors checked using the schema error module 152. For instance, error graphs 156 may be utilized by the error check engine 150 to identify errors involving multiple data fields, and multiple logic expressions and functions. Similar to the calculation graphs 14 discussed above, the error graphs 156 comprise a plurality of interconnected nodes, including leaf or input nodes 24, functional nodes 26 and/or functions 28.

FIGS. 9A-9F illustrate a number of examples of error graphs 156 for identifying errors in the preparation of a payroll tax form. Similar to the calculation graphs 14 described above, the error graphs 156 include leaf or input nodes 24 the values of which are accessed from the shared data store, such as tax data values and calculated payroll data values. The error graphs 156 also include functional nodes 26 which represent a payroll tax concept, or result from a function 28, such as a mathematical function or a logical expression. The functional node 26 may include a number or value in some instances, or a response to a logical function such as a Boolean expression like "true" or "false", in other instances.

Figure 9A:
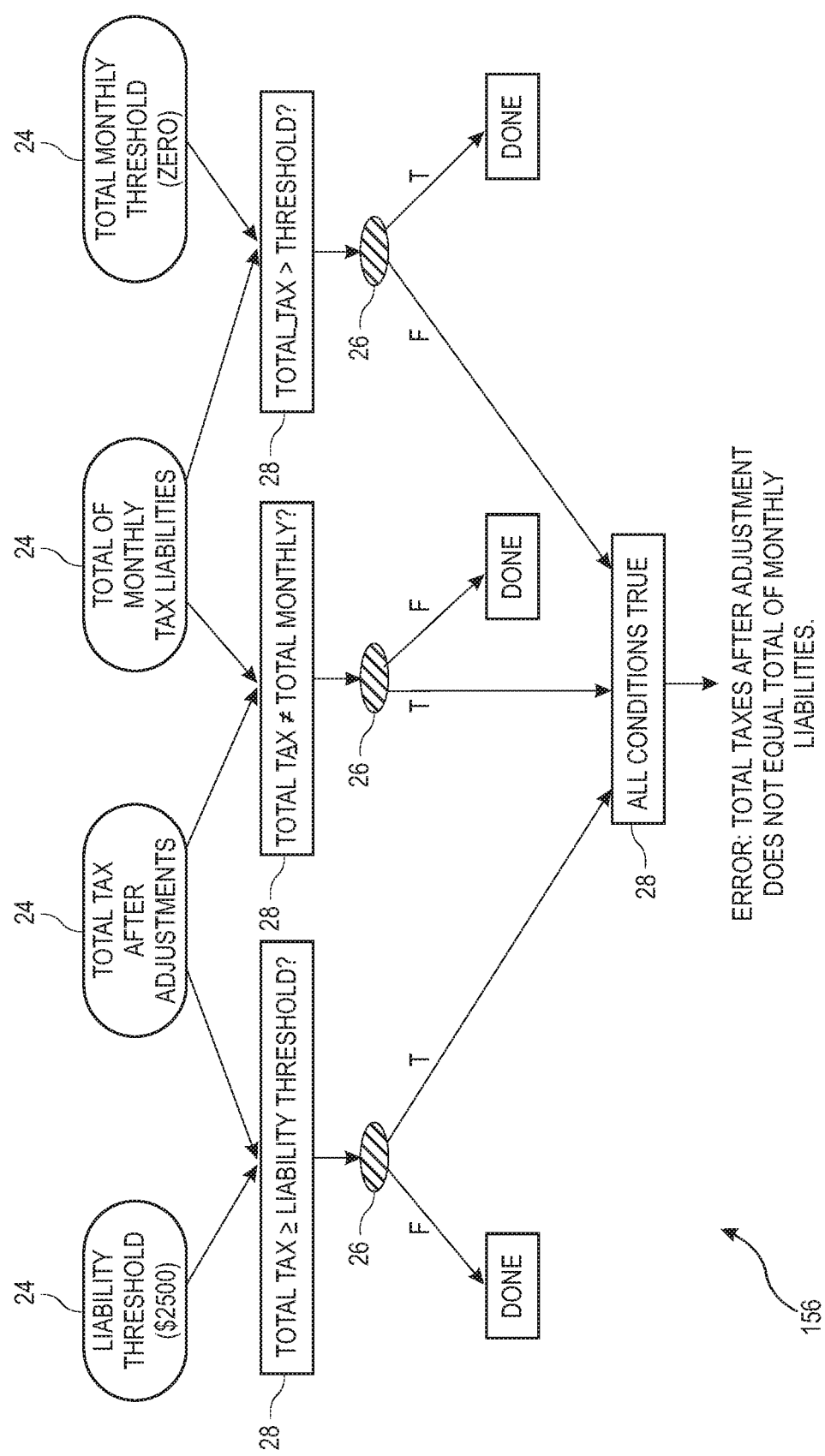
FIG. 9A illustrates an example of an error graph for identifying an error regarding a mismatch between total tax after adjustment and total of monthly tax liability, according to one embodiment of the present invention.

For instance, FIG. 9A is an example of an error graph 156 for identifying an error regarding the total tax after adjustment not being equal to the total of the monthly tax liability in preparing IRS Form 944 for 2015. The error graph 156 includes input nodes 24, including certain constants consisting of thresholds, and calculated payroll data, like the total tax after adjustments and the total of the monthly tax liabilities. XXX These may be accessed from the shared data store 42 as stored values for the input nodes 24 and/or function nodes 26 of the calculation graph(s) 14 for calculating the payroll tax form, as described herein. The error graph 156 also includes function nodes 28 having Boolean logical operators for comparing certain values, and functional nodes 26 representing the results of the logical operators. The "DONE" result for a functional node 26 indicates that there is no error based on that particular calculation path of the error graph 156.

Figure 9B:
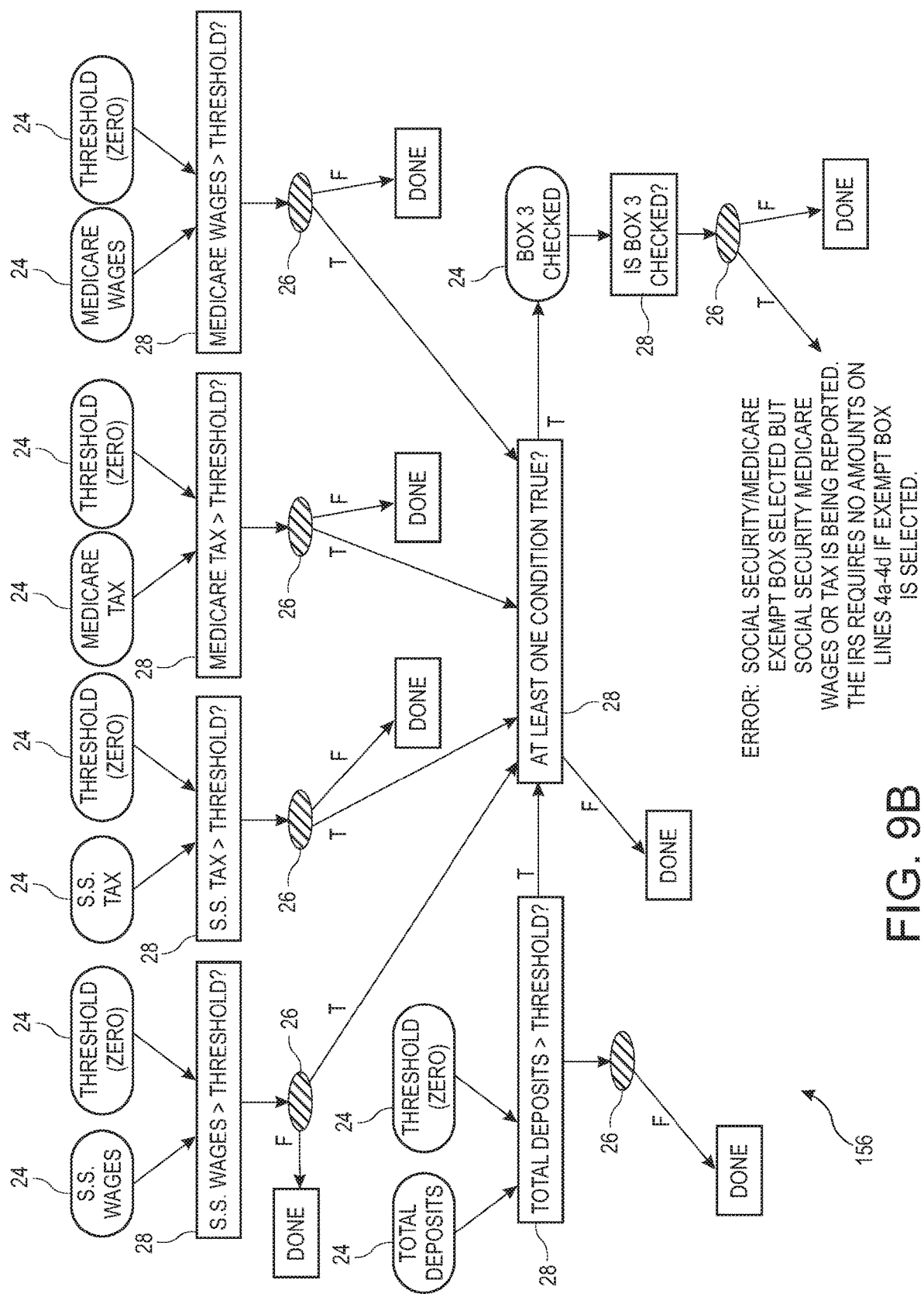
FIG. 9B illustrates an example of an error graph for identifying an error regarding a mismatch between social security/medicare exempt box selected and social security/medicare wages reported, according to one embodiment of the present invention.
Figure 9C:
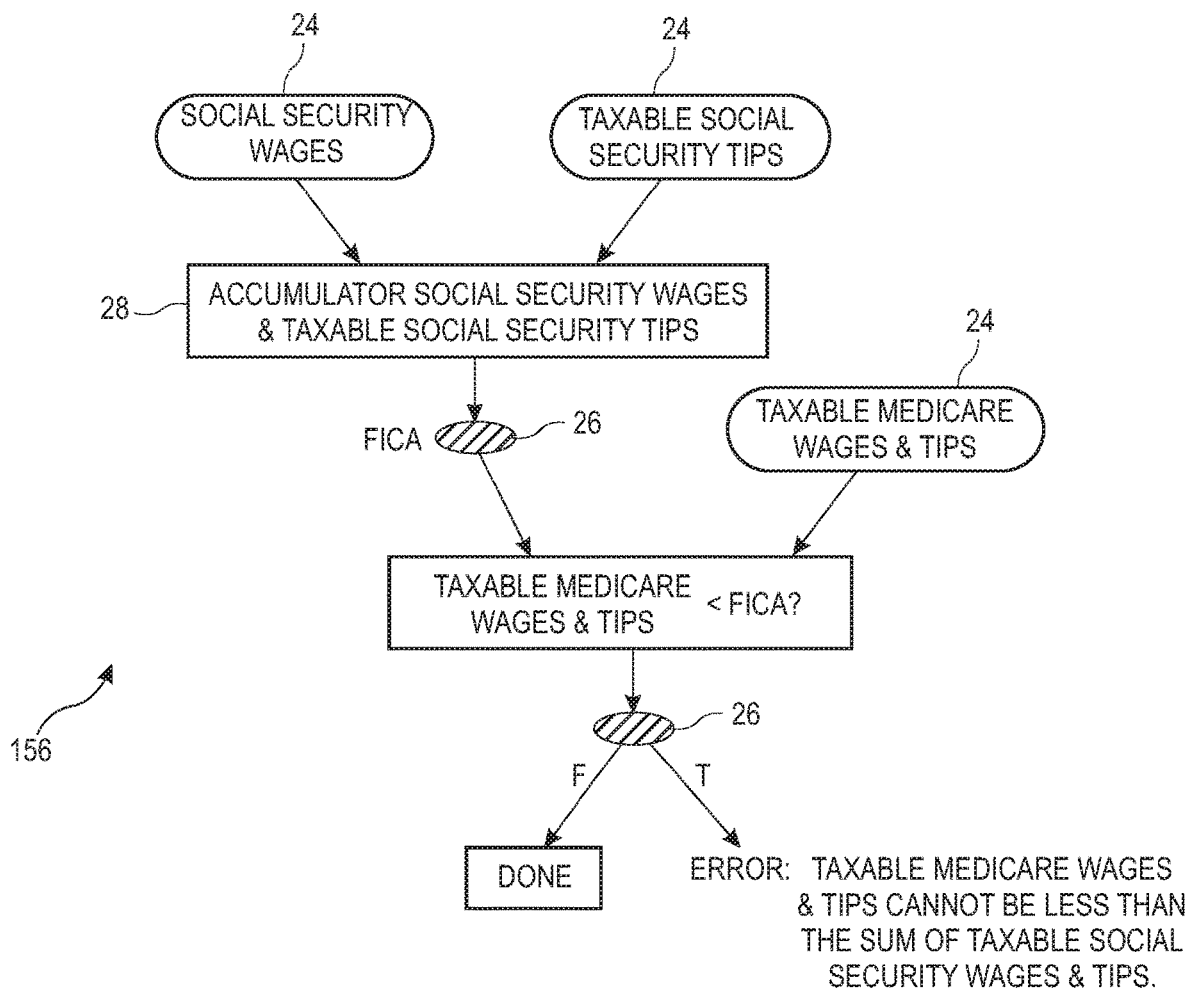
FIG. 9C illustrates an example of an error graph for identifying an error regarding a taxable medicare wages and tips being less than sum of taxable social security wages and tips, according to one embodiment of the present invention.
Figure 9D:
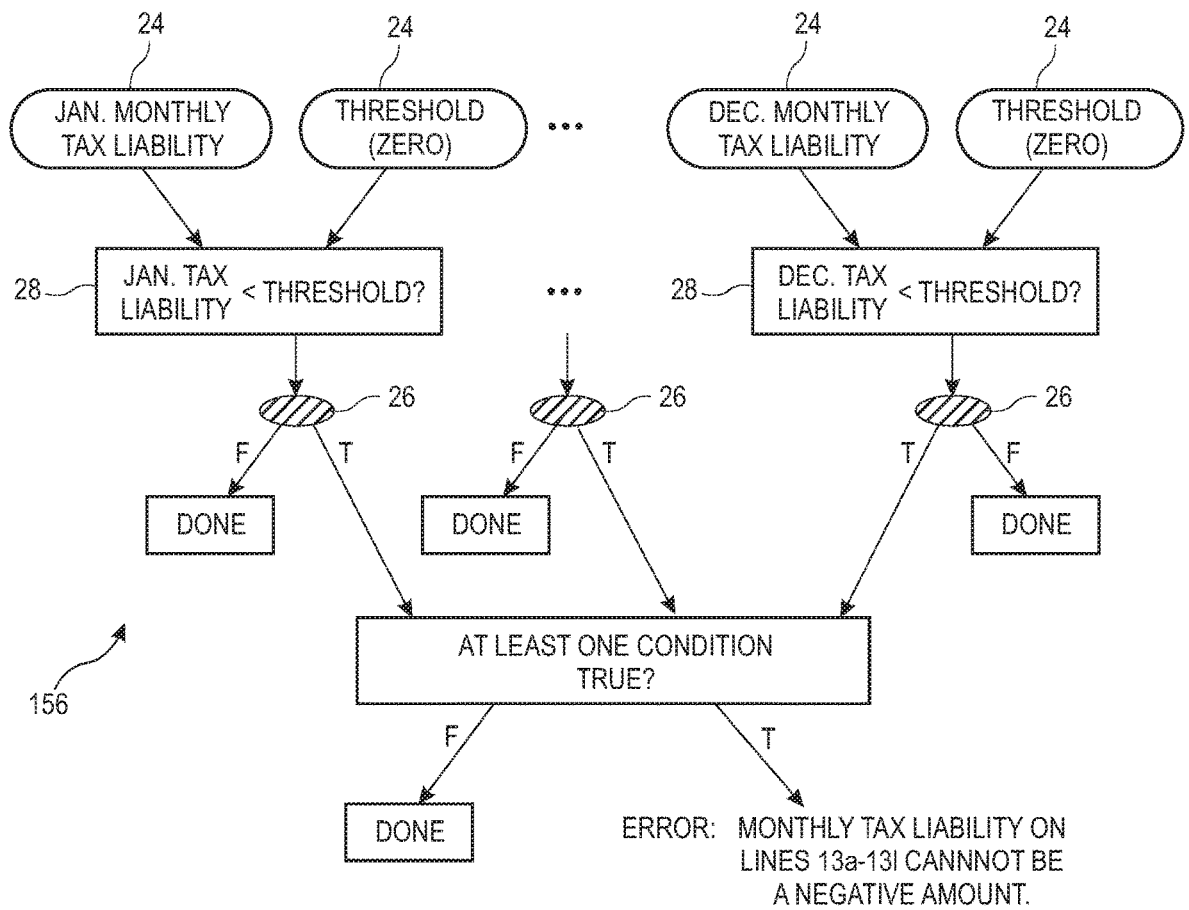
FIG. 9D illustrates an example of an error graph for identifying an error regarding entry of negative amounts for monthly tax liability, according to one embodiment of the present invention.
Figure 9E:
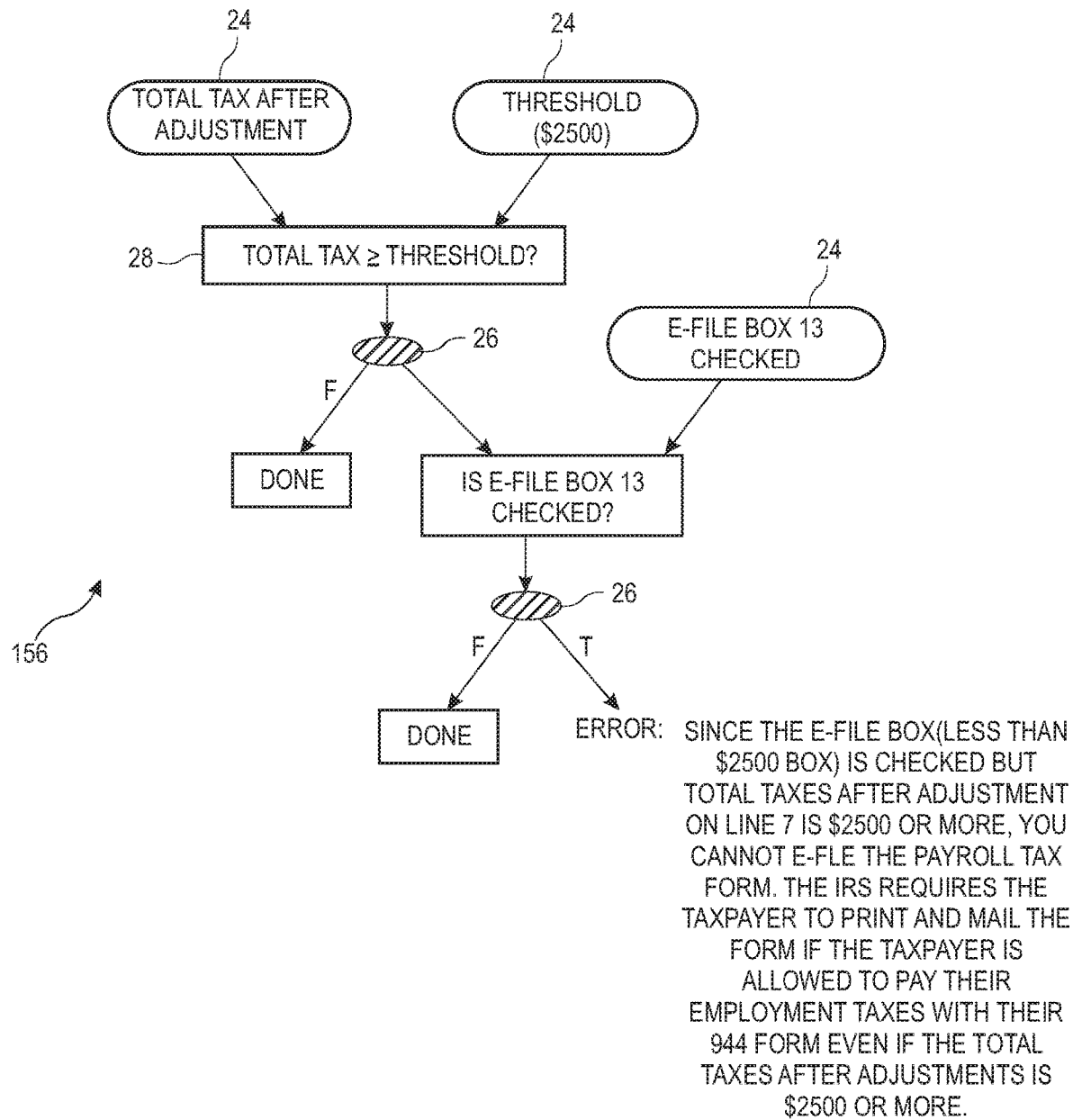
FIG. 9E illustrates an example of an error graph for identifying an error regarding a mismatch between checking a box that total tax after adjustment is less than a threshold (e.g., $2500), but total tax after adjustment is greater than the threshold, according to one embodiment of the present invention.
Figure 9F:
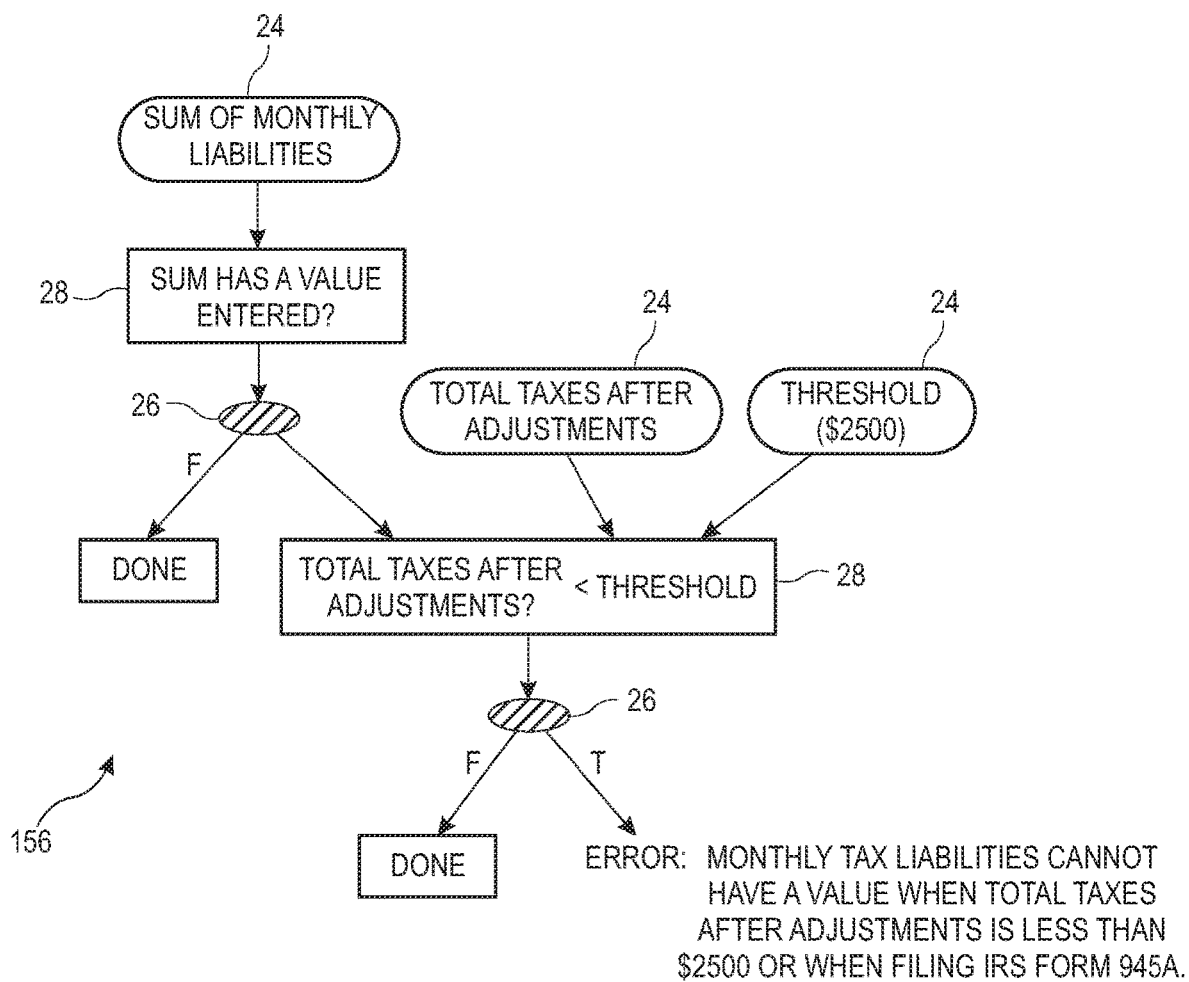
FIG. 9F illustrates an example of an error graph for identifying an error regarding entry of monthly tax liability amounts when total tax after adjustment is less than a threshold (e.g., $2500), according to one embodiment of the present invention.

The error graphs 156 in FIGS. 9B-9E each include input nodes 24, function nodes 28 and functional nodes 26, similar to the error graph 156 in FIG. 9A, for identifying other various errors in the preparation of a payroll tax form. FIG. 9B illustrates an error graph 156 for identifying an error caused by a mismatch between a selection of the social security/medicare exempt box selected and the reporting of actual social security/medicare wages in preparing IRS Form 944 for 2015. FIG. 9C illustrates an error graph 156 for identifying an error regarding the reported taxable medicare wages and tips being less than the sum of taxable social security wages and tips in preparing IRS Form 944 for 2015. FIG. 9D illustrates an example of an error graph 156 for identifying an error caused by entry of negative amounts for monthly tax liability in preparing IRS Form 944 for 2015. FIG. 9E illustrates an example of an error graph 156 for identifying an error caused by checking a box that total tax after adjustment is less than a threshold (e.g., $2500), but the calculated total tax after adjustment is greater than the threshold in preparing IRS Form 944 for 2015.

The error check engine 150 is configured to process each of the error graphs 156 to identify whether there is an error in preparing the payroll tax form for which the respective error graph 156 is configured. The error check engine 150 simply traverses the nodes of the error graph 156, and accesses data for input nodes 24, performs functions for function nodes 28 and fills in the result of the functional nodes 26, as needed by the particular error graph 156.

Similar to the error explanations associated with error rules described above, the nodes of the error graphs 156 may be associated with a node error explanation which can be used to generate an narrative explanation of an error associated with a particular node or calculation path including such node. The node error explanation may include a narrative explanation, fragments, expressions, and/or partial statements. The error check engine 150 and/or explanation engine 154 are configured to utilize the node error explanations to generate a narrative explanation of errors identified according to a particular error graph 156, in the same or similar manner as that described above for error rules. For instance, a node error explanation associated with a node on error graph 156 of FIG. 9A may be a complete sentence such as "The total taxes after adjustment does not equal the total of the monthly liabilities. You must make the necessary adjustments to reconcile the amounts." The node error explanation may be a template having fillable fields and the error check engine 150 and/or explanation engine may be configured to provide the explanation as well as providing a description of the specific erroneous input, such as "The total tax after adjustment is $_____, which is not equal to the total of monthly liabilities which is $_____." As shown in the example above, the error explanation may also include a recommendation or requirement for correcting the error.

XXX Report The errors identified by the error check engine 150 using the error graphs 156 and the explanations generated by the error check engine 150 and/or explanation engine 154 may be compiled into a report for use by a user, the same as the errors and explanations regarding the error rules, as described above. Similarly, the explanation engine can transmit the error explanations to the UI controller 80 which can then display the explanations to a user, and/or utilize the errors in the process of data entry via the UI manager 82. The explanation engine 154 may be configured to utilize the narrative explanation, fragments, expressions, and/or partial statements of the error explanations associated with nodes of the error graphs 156 to generate natural language expressions that are more easily understood by a user, same or similar to the error explanations associated with the error rules.

In addition, the payroll system 40 can be configured to include both of the error checking systems, namely, the error checking utilizing the schema error module 152 and the error checking utilizing the error graphs 156. The errors and error explanations from both error checking systems can be compiled together into a report, and/or reported collectively to a user via the UI manager 82. Alternatively, the payroll system 40 can be configured to include only one of the error checking systems, either the schema error module 152 based system or the error graph 156 based system.

Figure 12:
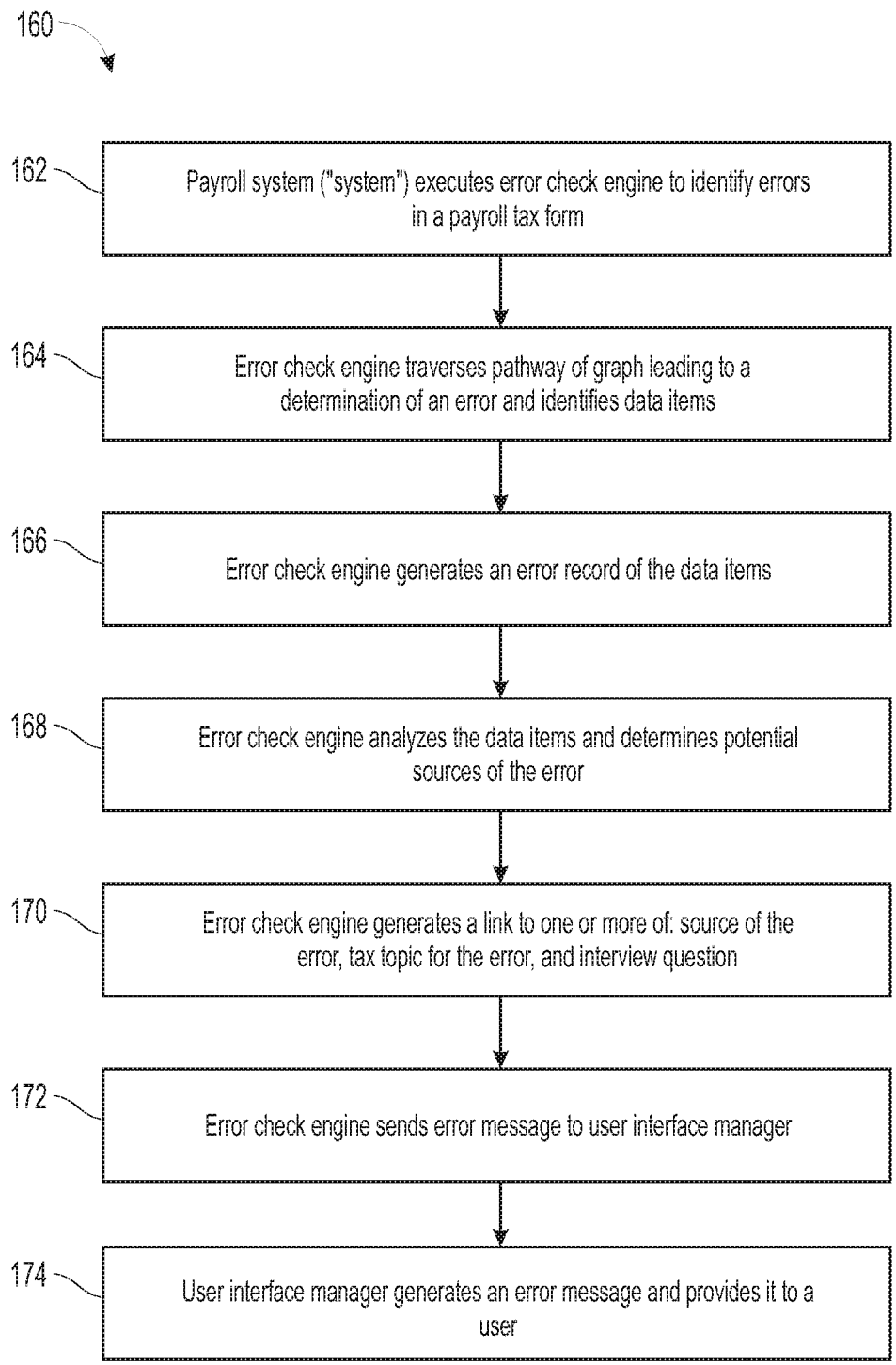
FIG. 12 illustrates a flow chart for a method for identifying the source of an error, including schema errors and errors determined using error graphs, according to one embodiment of the present invention.

Referring to FIG. 12, a flow chart for a method 160 for identifying the source of an error, including schema errors and errors determined using error graphs 156 is illustrated. The method 160 will be described as being implemented by the error check engine 150, but it can be implemented by another computing module as well. At step 162, the payroll system 40 executes the error check engine 150 to identify errors in a payroll tax form being prepared using the payroll system 40. At step 164, the error check engine 150 traverses the pathway of the error graph which leads to determination of an error in a payroll tax form being identified as described herein and identifies each of the data items along the error pathway. The data items may be payroll tax form fields, and/or calculation nodes including one or more of input nodes 24 and function nodes 26 of the calculation graph 14. These data items are each a potential source of the error, and may need modification in order to correct the error. At step 166, the error check engine 150 generates an error record which includes the data items in the error pathway. At step 168, the error check engine 150 analyzes the data items and determines potential sources of the error, which may be in the explanation of the errors or elsewhere. At step 170, the error check engine 150 generates a link to one or more of: the source(s) of the error, the tax topic in which the error occurred, and/or the interview question at which the error occurred. At step 172, the error check engine 150 may then send an error message to the UI controller 80. At step 174, in response to the error message, the UI controller 80 generates an error message and provides it to a user. The error message may include the explanation of the error (such as the error explanations associated with the error rules and error nodes and the narrative explanations generated therefrom, as described above), recommendations for correcting the error, and/or data entry fields or links to data entry fields to modify the payroll tax form to correct the error.

Turning to FIG. 13, an example of an error report 190 in a table form is shown. The error report 190 includes a plurality of rows 192, in which each row 192 is an individual error. The error report 190 also includes a plurality of columns 194, in which each column includes error data for each error. For example, for each error, the error report 190 may include: identification of the payroll tax form in which the error occurred, identification of the error, an error code, an explanation of the error, a plain language explanation of the error, one or more recommendations for correcting the error, a date and time of the error, a link (e.g., a hyperlink) to the location of the error within a payroll tax form, one or more link(s) (e.g., hyperlink(s) to the tax topic(s) interview question(s) and/or payroll tax form data field at which the error occurred.

Figure 10:
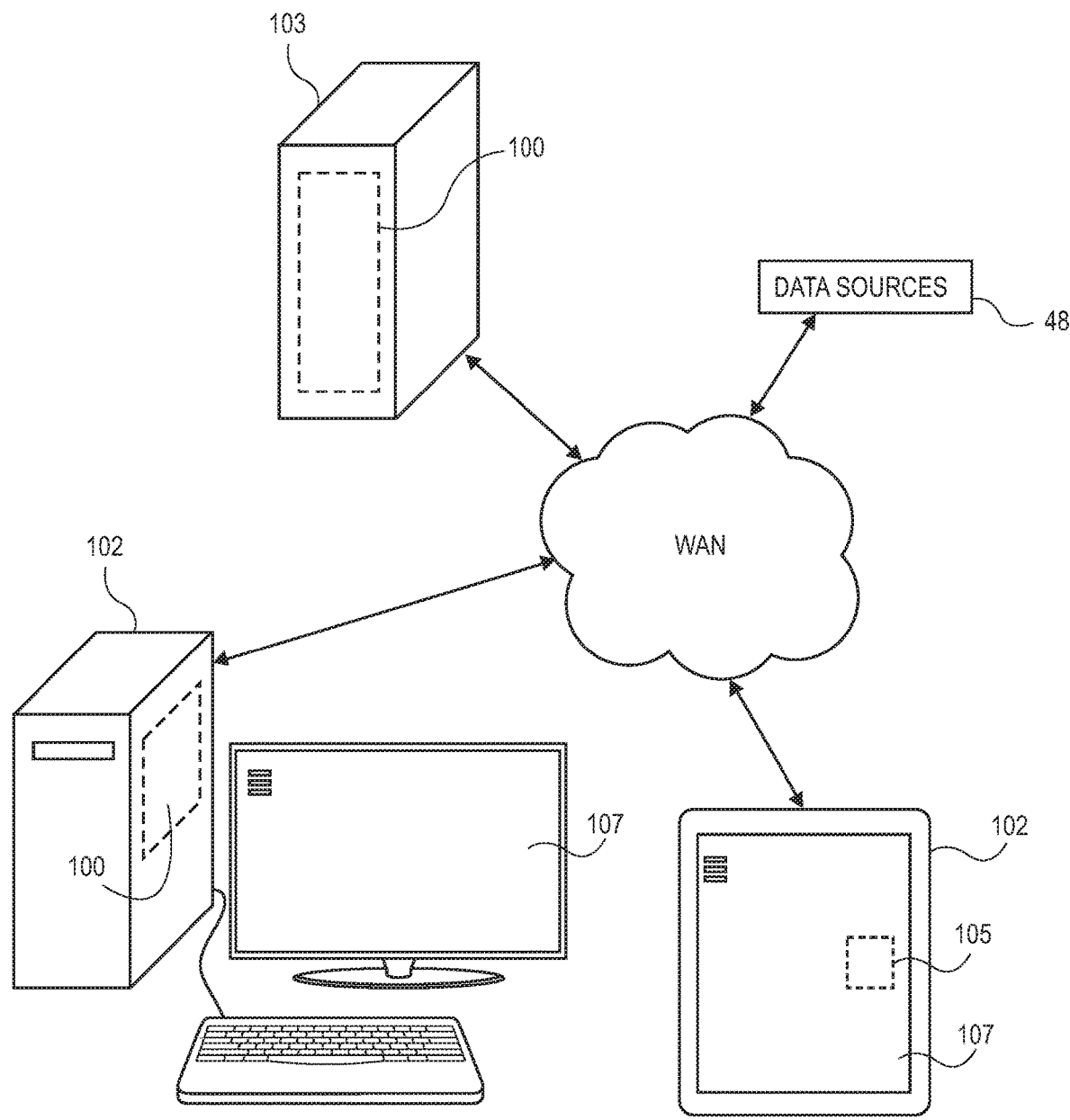
FIG. 10 illustrates the implementation of a payroll system having a payroll tax form preparation software application on various computing devices, according to one embodiment of the present invention.

The operation of the payroll system 40 is described above, but a summary of the overall operation will now be described with reference to an exemplary payroll system 40 implemented on various computing devices, as shown in FIG. 10. A user initiates the payroll tax form preparation software 100 on a computing device 102, 103 as seen in order to prepare a payroll tax form for submission to an appropriate tax agency. The payroll tax form preparation software 100 may reside on the actual computing device 102 that the user interfaces with or, alternatively, the payroll tax form preparation software 100 may reside on a remote computing device 103 such as a server or the like as illustrated. In such an instances, the computing device 102 that is utilized by the user communicates via the remote computing device 103 using an application 105 contained on the computing device 102. The payroll tax form preparation software 100 may also be run using conventional Internet browser software. Communication between the computing device 102 and the remote computing device 103 may occur over a wide area network such as the Internet. Communication may also occur over a private communication network (e.g., mobile phone network).

A user initiating the payroll tax form preparation software 100, as explained herein may import employer-specific payroll tax data form one or more data sources 48. Tax data may also be input manually with user input 48a. The calculation engine 50 computes one or more payroll calculations dynamically based on the then available data at any given instance within the schema 44 in the shared data store 42. In some instances, estimates or educated guesses may be made for missing data. As the payroll tax form preparation software 100 is calculating or otherwise performing tax operations, the error check engine 150 and explanation engine 110 are executing to identify errors and generate error explanations, and to provide to the user one or more narrative explanations regarding calculations or operations being performed. The errors and/or error explanations are reported to the user in a report or displayed to the user via the UI manager 82.

FIG. 11 generally illustrates components of a computing device 102, 103 that may be utilized to execute the software for automatically calculating and preparing a payroll tax form for electronic or paper submission. The components of the computing device 102/103 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 14 is provided to generally illustrate how embodiments may be configured and implemented.

Method embodiments may also be embodied in, or readable from, a non-transitory computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/ or embodied on the carrier to implement the method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A system for generating an error report listing errors occurring in the computerized preparation of a payroll tax form to be submitted to a tax agency, comprising:

a computing device having a computer processor and memory;

a data store in communication with the computing device, the data store configured to store employer-specific payroll data for a plurality of tax data fields and calculated payroll data fields; and a payroll tax form preparation software application executable by the computing device, the tax preparation software application having a payroll tax logic agent, a user interface manager, a payroll calculation engine, an error check engine and an error graph, the error graph comprising a plurality of interconnected nodes including one or more of input nodes, function nodes, and functional nodes, wherein the error graph utilizes a plurality of the tax data fields and payroll data fields, the payroll tax logic agent is configured to generate a plurality of non-binding suggestions to present questions on a display to a user during preparation of the payroll tax form, the user interface manager is configured to receive the plurality of non-binding suggestions from the payroll tax logic agent and, based on at least one configuration file, determine whether the plurality of non-binding suggestions are to be processed and, for suggestions determined to be processed, the user interface manager is configured to utilize a decision table to present questions based on the suggestions to the user on a display, such that at least one row of the decision table is eliminated based on whether that row contains a first predefined value and at least one column of the decision table is eliminated based on rows remaining in the decision table, wherein the rows of the decision table are associated with tax rules and the columns of the decision table are associated with the questions, the payroll calculation engine is configured to read the employer-specific tax data from the shared data store and write calculated payroll data to the shared data store;

the error check engine is configured to:

read the tax data and payroll data from the shared data store and process the error graph to identify one or more errors in the preparation of the payroll tax form, wherein the identification of the one or more errors includes determining via metadata whether a data value for the payroll data fields conforms to schema requirements of the payroll tax form, the metadata being based on the tax agency's schema requirements, and compile a plurality of errors identified in the preparation of a plurality of payroll tax forms into a report.

2. The system of claim 1, wherein the report is one of a log file, an email, a web page configured for display on a web browser, and an electronic document.

3. The system of claim 1, wherein for each error, the report includes: identification of a payroll tax form for the error; a description of the error; a recommendation for correcting the error; and a link to an error correction page.

4. The system of claim 1, wherein one or more of the nodes of the error graph is associated with one or more respective error explanations, and the system further comprises:

an explanation engine configured to generate a first narrative explanation utilizing the error explanations associated with one or more nodes of the error graph.

5. The system of claim 4, wherein the error explanations comprise templates having fillable fields and the explanation engine is configured to generate the first narrative explanation using the templates and filling in the fillable fields using one or more of the tax data and the payroll data.

6. The system of claim 4, wherein the explanation engine includes a natural language generator configured to convert error explanations comprising fragments, expressions and partial statements into natural language expressions, such that the first narrative explanation comprises a natural language expression.

7. The system of claim 4, wherein the system is configured to automatically generate the first narrative explanation.

8. The system of claim 4, wherein system is configured to automatically generate an additional narrative explanation with more detail than the first narrative explanation in response to a user prompt.

9. The system of claim 1, wherein the payroll tax form preparation software application further comprises a payroll calculation graph comprising a plurality of interconnected calculation nodes including one or more of input nodes and function nodes, and the payroll calculation engine performs the plurality of payroll calculation operations based on the payroll calculation graph.

10. A computer-implemented method for generating an error report listing errors occurring in the computerized preparation of a payroll tax form to be submitted to a tax agency, the method comprising:

a payroll system executing a payroll tax form preparation software application, the payroll system comprising a computing device having a computer processor and memory and a data store configured to store employer-specific tax data for a plurality of tax data fields in communication with the computing device, the payroll tax form preparation software application having a payroll tax logic agent, a user interface manager, a payroll calculation engine, an error check engine and an error graph, the error graph comprising a plurality of interconnected nodes including one or more of input nodes, function nodes, and functional nodes, wherein the error graph utilizes a plurality of the tax data fields and payroll data fields;

the payroll tax logic agent generating a plurality of non-binding suggestions to present questions on a display to a user during preparation of the payroll tax form;

the user interface manager receiving the plurality of non-binding suggestions from the payroll tax logic agent and, based on at least one configuration file, determining whether the plurality of non-binding suggestions are to be processed and, for suggestions determined to be processed, presenting questions, via a decision table, based on the suggestions to the user on a display, such that at least one row of the decision table is eliminated based on whether that row contains a first predefined value and at least one column of the decision table is eliminated based on rows remaining in the decision table, wherein the rows of the decision table are associated with tax rules and the columns of the decision table are associated with the questions;

the payroll calculation engine reading the employer-specific tax data from the shared data store, performing a plurality of payroll calculation operations, and writing calculated payroll data for a plurality of payroll data fields to the shared data store;

the error check engine reading the tax data and payroll data from the shared data store and processing the error graph to identify one or more errors in the preparation of the payroll tax form, wherein the identification of the one or more errors includes determining via metadata whether a data value for the payroll data fields conforms to schema requirements of the payroll tax form, the metadata being based on the tax agency's schema requirements; and the error check engine compiling a plurality of errors identified in the preparation of a plurality of payroll tax forms into a report.

11. The method of claim 10, wherein one or more of the nodes of the error graph is associated with one or more respective error explanations, and the method further comprises:

an explanation engine within the payroll tax form preparation software generating a first narrative explanation utilizing the error explanations associated with one or more nodes of the error graph related to the one or more errors identified by the error check engine.

12. The method of claim 11, wherein the error explanations comprise templates having fillable fields and the method further comprises: the explanation engine generating the first narrative explanation using the templates and filling in the fillable fields using the tax data.

13. The method of claim 11, further comprising:

the explanation engine executing a natural language generator configured to convert error explanations comprising fragments, expressions and partial statements into natural language expressions, to generate the first narrative explanation in the form of a natural language expression.

14. The method of claim 11, wherein the payroll system automatically generates the first narrative explanation.

15. The method of claim 11, wherein the payroll system automatically generates an additional narrative explanation with more detail than the first narrative explanation in response to a user prompt.

16. The method of claim 10, wherein:
the payroll tax form preparation software application further comprises a payroll calculation graph comprising a plurality of interconnected calculation nodes including one or more of input nodes and function nodes; and
the payroll calculation engine performs the plurality of payroll calculation operations based on the payroll calculation graph.

17. An article of manufacture comprising a non-transitory computer program carrier readable by a computer and embodying instructions executable by the computer to perform a process for identifying errors in the preparation of an electronic payroll tax form to be submitted to a tax agency using a payroll system, the process comprising:
the payroll system executing a payroll tax form preparation software application, the payroll system comprising a computing device having a computer processor and memory and a data store configured to store employer-specific tax data for a plurality of tax data fields in communication with the computing device, the payroll tax form preparation software application having a payroll tax logic agent, a user interface manager, a payroll calculation engine, an error check engine and an error graph, the error graph comprising a plurality of interconnected nodes including one or more of input nodes, function nodes, and functional nodes, wherein the error graph utilizes a plurality of the tax data fields and payroll data fields;
the payroll tax logic agent generating a plurality of non-binding suggestions to present questions on a display to a user during preparation of the payroll tax form;
the user interface manager receiving the plurality of non-binding suggestions from the payroll tax logic agent and, based on at least one configuration file, determining whether the plurality of non-binding suggestions are to be processed and, for suggestions determined to be processed, presenting questions, via a decision table, based on the suggestions to the user on a display, such that at least one row of the decision table is eliminated based on whether that row contains a first predefined value and at least one column of the decision table is eliminated based on rows remaining in the decision table, wherein the rows of the decision table are associated with tax rules and the columns of the decision table are associated with the questions;
the payroll calculation engine reading the employer-specific tax data from the shared data store, performing a plurality of payroll calculation operations based on the payroll calculation graph, and writing calculated payroll data for a plurality of payroll data fields to the shared data store;
the error check engine reading the tax data and payroll data from the shared data store and processing the error graph to identify one or more errors in the preparation of the payroll tax form, wherein the identification of the one or more errors includes determining via metadata whether a data value for the payroll data fields conforms to schema requirements of the payroll tax form, the metadata being based on the tax agency's schema requirements; and
the error check engine compiling a plurality of errors identified in the preparation of a plurality of payroll tax forms into a report.

18. The article of claim 17, wherein one or more of the nodes of the error graph is associated with one or more respective error explanations, and the process further comprises:
an explanation engine within the payroll tax form preparation software generating a first narrative explanation utilizing the error explanations associated with one or more nodes of the error graph related to the one or more errors identified by the error check engine.

19. The article of claim 18, wherein the error explanations comprise templates having fillable fields and the process further comprises:
the explanation engine generating the first narrative explanation using the templates and filling in the fillable fields using the tax data.

20. The article of claim 18, wherein the process further comprises:
the explanation engine executing a natural language generator configured to convert error explanations comprising fragments, expressions and partial statements into natural language expressions, to generate the first narrative explanation in the form of a natural language expression.

21. The article of claim 18, wherein the payroll system automatically generates the first narrative explanation.

22. The article of claim 18, wherein the payroll system automatically generates an additional narrative explanation with more detail than the first narrative explanation in response to a user prompt.

23. The article of claim 18, wherein:
the payroll tax form preparation software application further comprises a payroll calculation graph comprising a plurality of interconnected calculation nodes including one or more of input nodes and function nodes; and
the payroll calculation engine performs the plurality of payroll calculation operations based on the payroll calculation graph.

* * * * *